US010983490B2

(12) United States Patent
Yamashita et al.

(10) Patent No.: US 10,983,490 B2
(45) Date of Patent: *Apr. 20, 2021

(54) VIBRATION CONTROL SYSTEM, METHOD AND APPARATUS WITH GAME CONTROLLER

(71) Applicant: NINTENDO CO., LTD., Kyoto (JP)

(72) Inventors: Kei Yamashita, Kyoto (JP); Takafumi Aoki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 19 days.

This patent is subject to a terminal disclaimer.

(21) Appl. No.: 15/444,786

(22) Filed: Feb. 28, 2017

(65) Prior Publication Data

US 2017/0300022 A1    Oct. 19, 2017

(30) Foreign Application Priority Data

Apr. 13, 2016   (JP) .............................. JP2016-080305

(51) Int. Cl.
*G05B 19/042*    (2006.01)
*A63F 13/285*    (2014.01)
*A63F 13/28*    (2014.01)
*G06F 9/30*    (2018.01)
*A63F 13/235*    (2014.01)

(52) U.S. Cl.
CPC .......... *G05B 19/042* (2013.01); *A63F 13/235* (2014.09); *A63F 13/28* (2014.09); *A63F 13/285* (2014.09); *G06F 9/30032* (2013.01); *G05B 2219/39241* (2013.01)

(58) Field of Classification Search
CPC .... G05B 19/042; A63F 13/28; G06F 9/30032
See application file for complete search history.

(56) References Cited

U.S. PATENT DOCUMENTS

| | | | | |
|---|---|---|---|---|
| 6,004,209 A | * | 12/1999 | Katsumoto | ............. A63F 13/02 181/171 |
| 6,317,825 B1 | * | 11/2001 | Commercial | ....... G06F 9/30018 708/490 |
| 6,411,276 B1 | * | 6/2002 | Braun | ................... G05G 9/047 345/156 |
| 2006/0068910 A1 | | 3/2006 | Schmidt et al. | |

(Continued)

FOREIGN PATENT DOCUMENTS

| | | |
|---|---|---|
| EP | 0 978 803 | 2/2000 |
| EP | 2 353 677 A2 | 8/2011 |

(Continued)

OTHER PUBLICATIONS

Extended European Search Report dated Sep. 8, 2017 issued in corresponding European Application No. 17157519.4 (8 pgs).

(Continued)

*Primary Examiner* — Yingchuan Zhang
(74) *Attorney, Agent, or Firm* — Nixon & Vanderhye, P.C.

(57) ABSTRACT

Vibration instruction data transmitted from another apparatus is received, data related to the vibration instruction data is stored in a memory, and a vibration apparatus is vibrated using the data stored in the memory. On the other hand, vibration state data indicating a vibration state of the vibration apparatus is generated, and the vibration state data is transmitted to the other apparatus.

26 Claims, 14 Drawing Sheets

(56) References Cited

U.S. PATENT DOCUMENTS

| | | | |
|---|---|---|---|
| 2007/0222750 A1* | 9/2007 | Ohta | A63F 13/00 |
| | | | 345/158 |
| 2007/0257927 A1 | 11/2007 | Sakanishi et al. | |
| 2007/0285216 A1 | 12/2007 | Tierling et al. | |
| 2008/0010434 A1 | 1/2008 | Jitsukawa et al. | |
| 2011/0157052 A1 | 6/2011 | Lee et al. | |
| 2011/0159958 A1 | 6/2011 | Miura et al. | |
| 2011/0190050 A1 | 8/2011 | Mae et al. | |

FOREIGN PATENT DOCUMENTS

| | | |
|---|---|---|
| JP | 2000-122675 | 4/2000 |
| JP | 2008-253561 | 10/2008 |
| JP | 2010-46471 | 3/2010 |
| JP | 4531770 | 6/2010 |
| JP | 2011-156441 | 8/2011 |
| JP | 5295500 | 6/2013 |

OTHER PUBLICATIONS

Extended European Search Report dated Sep. 11, 2017 issued in European Application No. 17158243.0 (8 pgs.).
Yamashita et al., U.S. Appl. No. 15/446,280, filed Mar. 1, 2017 (58 pages).
Office Action dated May 29, 2019 issued in U.S. Appl. No. 15/446,280 (15 pgs.).
Office Action dated Feb. 8, 2019 issued in U.S. Appl. No. 15/446,280 (12 pgs.).

\* cited by examiner

F I G. 5

| NUMBER | EQUABLE BIT PATTERN | |
| --- | --- | --- |
| | BINARY NOTATION | HEXADECIMAL NOTATION |
| a_{16, 0} | 0000 0000 0000 0000 | 0000 |
| a_{16, 1} | 1000 0000 0000 0000 | 8000 |
| a_{16, 2} | 1000 0000 1000 0000 | 8080 |
| a_{16, 3} | 1000 0010 0001 0000 | 8210 |
| a_{16, 4} | 1000 1000 1000 1000 | 8888 |
| a_{16, 5} | 1000 1001 0010 0100 | 8924 |
| a_{16, 6} | 1001 0010 1001 0010 | 9292 |
| a_{16, 7} | 1001 0101 0010 1010 | 952A |
| a_{16, 8} | 1010 1010 1010 1010 | AAAA |
| a_{16, 9} | 1010 1010 1101 0101 | AAD5 |
| a_{16,10} | 1010 1101 1010 1101 | ADAD |
| a_{16,11} | 1011 0110 1101 1011 | B6DB |
| a_{16,12} | 1011 1011 1011 1011 | BBBB |
| a_{16,13} | 1011 1101 1110 1111 | BDEF |
| a_{16,14} | 1011 1111 1011 1111 | BFBF |
| a_{16,15} | 1011 1111 1111 1111 | BFFF |
| a_{16,16} | 1111 1111 1111 1111 | FFFF |

DATA SEQUENCE OF 25% DUTY CYCLE

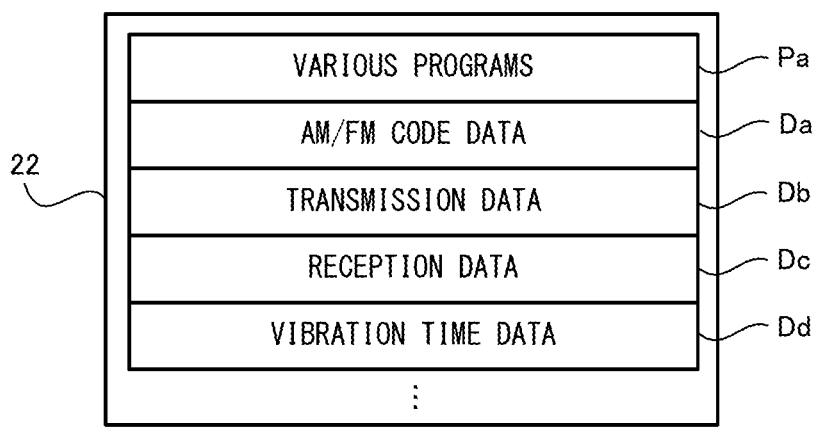
F I G. 1 0

VIBRATION CONTROL SYSTEM, METHOD AND APPARATUS WITH GAME CONTROLLER

CROSS REFERENCE TO RELATED APPLICATION

The disclosure of Japanese Patent Application No. 2016-080305, filed on Apr. 13, 2016, is incorporated herein by reference.

FIELD

The technology shown here relates to a vibration control system, a vibration control method, a vibration output apparatus, a game controller, a storage medium having stored therein a vibration output program, a vibration output method, a vibration control apparatus, and a storage medium having stored therein a vibration control program, and in particular, relates to a vibration control system, a vibration control method, a vibration output apparatus, a game controller, a storage medium having stored therein a vibration output program, a vibration output method, a vibration control apparatus, and a storage medium having stored therein a vibration control program in which, for example, a plurality of apparatuses transmit data related to a vibration to each other.

BACKGROUND AND SUMMARY

Conventionally, there is a game system for achieving a so-called vibration-feedback game in which a vibrator provided in a controller is vibrated, thereby transmitting a vibration to the hand of a user holding the controller. In the game system, a signal indicating that a vibration is to be generated is transmitted from a game apparatus main body to the controller. Then, based on the vibration, the vibrator in the controller vibrates, thereby transmitting the vibration to the user.

In the game system, however, a predetermined signal is merely transmitted from the game apparatus main body to the controller at certain intervals. Thus, the game apparatus main body cannot understand the vibration output state of the controller.

Therefore, it is an object of an exemplary embodiment to provide a vibration control system, a vibration control method, a vibration output apparatus, a game controller, a storage medium having stored therein a vibration output program, a vibration output method, a vibration control apparatus, and a storage medium having stored therein a vibration control program that make it possible to understand the state where a vibration is generated in an apparatus for generating a vibration.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a vibration control system according to the exemplary embodiment, a vibration control system includes at least a first apparatus and a second apparatus and vibrates a vibration apparatus. The first apparatus includes a computer processor configured to: receive vibration instruction data transmitted from the second apparatus; generate vibration state data indicating a vibration state of the vibration apparatus; store data related to the received vibration instruction data in a memory; vibrate the vibration apparatus using the data stored in the memory; and transmit the vibration state data to the second apparatus. The second apparatus includes a computer processor configured to: receive the vibration state data transmitted from the first apparatus; based on the received vibration state data, determine vibration instruction data to be transmitted next to the first apparatus; and transmit the determined vibration instruction data to the first apparatus.

Based on the above, vibration state data indicating a vibration state of a vibration apparatus is transmitted from a first apparatus for vibrating a vibration apparatus to a second apparatus for controlling a vibration. Thus, the second apparatus can understand the vibration state of the vibration apparatus.

Further, in the generation of the vibration state data, information indicating a state of the data related to the vibration instruction data stored in the memory may be generated as the vibration state data.

Based on the above, the second apparatus can understand the state of data related to vibration instruction data stored in storage means to vibrate the vibration apparatus. Thus, it is possible to understand a more accurate vibration state of the vibration apparatus.

Further, in the vibration of the vibration apparatus, the data related to the vibration instruction data stored in the memory to vibrate the vibration apparatus may be output to the vibration apparatus, and the data may also be deleted from the memory. In the generation of the vibration state data, information indicating a remaining amount of the data related to the vibration instruction data stored in the memory may be generated as the vibration state data.

Based on the above, the second apparatus can understand the remaining amount of the data related to the vibration instruction data to be output from the storage means to the vibration apparatus to vibrate the vibration apparatus. Thus, it is possible to understand a more accurate vibration state of the vibration apparatus.

Further, in the determination of the vibration instruction data, the vibration instruction data indicating a vibration for a vibration time corresponding to the remaining amount indicated by the received vibration state data may be determined.

Based on the above, it is possible to transmit the vibration instruction data indicating a vibration for an appropriate vibration time to the first apparatus.

Further, in the determination of the vibration instruction data, when the remaining amount indicated by the received vibration state data is larger than a predetermined amount, the vibration instruction data indicating a vibration for a relatively short vibration time may be determined.

Based on the above, it is possible to reduce the delay time from when the second apparatus transmits the vibration instruction data to when the vibration apparatus vibrates.

Further, in the determination of the vibration instruction data, the vibration instruction data indicating a vibration for a vibration time corresponding to the vibration state of the vibration apparatus indicated by the received vibration state data may be determined.

Based on the above, it is possible to reduce the delay time from when the second apparatus transmits vibration instruction data to when the vibration apparatus vibrates, and prevent the vibration of the vibration apparatus from being interrupted due to a delay in the transmission of the vibration instruction data.

Further, the computer processor of the first apparatus is further configured to output operation data corresponding to a user operation on the first apparatus. In this case, in the transmission of the vibration state data, the vibration state data may be transmitted together with the operation data to the second apparatus.

Based on the above, it is possible to reduce the number of times data is transmitted and received between the first apparatus and the second apparatus.

Further, in the generation of the vibration state data, data indicating the vibration state of the vibration apparatus at a time before the data related to the received vibration instruction data is stored in the memory may be generated as the vibration state data.

Based on the above, it is possible to create the vibration state data in the state where the remaining amount of data related to vibration instruction data stored in storage means is relatively small. Thus, it is possible to notify the second apparatus of a more detailed state using the number of bits that can be transmitted by the vibration state data.

Further, in the reception of the vibration instruction data, the vibration instruction data may be received through wireless communication. In the transmission of the vibration state data, the vibration state data may be transmitted through wireless communication. In the reception of the vibration state data, the vibration state data may be received through wireless communication. In the transmission of the vibration instruction data, the vibration instruction data may be transmitted through wireless communication.

Based on the above, even when the first apparatus and the second apparatus wirelessly communicate with each other, the vibration state data indicating the vibration state of the vibration apparatus is transmitted from the first apparatus to the second apparatus. Thus, the second apparatus can understand the vibration state of the vibration apparatus.

Further, in the determination of the vibration instruction data, modulation information indicating changes in an amplitude and/or a frequency may be encoded in a vibration waveform for vibrating the vibration apparatus, thereby generating the vibration instruction data. In the storage of the data in the memory, every time the vibration instruction data is received, data obtained by decoding the vibration instruction data may be stored in the memory.

Based on the above, the first apparatus can generate a vibration waveform of which the frequency and/or the amplitude can be changed.

Further, the first apparatus may include the vibration apparatus within the first apparatus.

Based on the above, even when the vibration apparatus is built into the first apparatus, the vibration state data indicating the vibration state of the vibration apparatus is transmitted from the first apparatus to the second apparatus. Thus, the second apparatus can understand the vibration state of the vibration apparatus.

Further, in the generation of the vibration state data, as the vibration state data, first vibration state data and second vibration state data different from the first vibration state data may be generated.

Based on the above, the first apparatus can transmit to the second apparatus a different parameter indicating the vibration state of the vibration apparatus. Thus, the second apparatus can understand a more detailed vibration state of the vibration apparatus.

Further, the exemplary embodiment may be carried out in the form of a vibration control method.

In an exemplary configuration of a vibration output apparatus according to the exemplary embodiment, a vibration output apparatus vibrates a vibration apparatus. The vibration output apparatus includes a computer processor configured to: receive vibration instruction data transmitted from another apparatus; generate vibration state data indicating a vibration state of the vibration apparatus; store data related to the received vibration instruction data in a memory; vibrate the vibration apparatus using the data stored in the memory; and transmit the vibration state data to the other apparatus.

Based on the above, vibration state data indicating a vibration state of a vibration apparatus is transmitted to another apparatus. Thus, the other apparatus can understand the vibration state of the vibration apparatus.

Further, the exemplary embodiment may be carried out in the forms of a non-transitory computer-readable storage medium having stored therein a vibration output program and a vibration output method.

In an exemplary configuration of a game controller according to the exemplary embodiment, a game controller is configured to wirelessly communicate with a game apparatus and includes a vibration apparatus within the game controller. The game controller includes a computer processor configured to: output operation data corresponding to a user operation on the game controller; receive, from the game apparatus through wireless communication, vibration instruction data for instructing the vibration apparatus to vibrate; store, in a memory, data related to the vibration instruction data received from the game apparatus; vibrate the vibration apparatus using the data stored in the memory; using the data stored in the memory, generate vibration state data indicating a state of the data related to the vibration instruction data; and transmit the vibration state data together with the operation data to the game apparatus through wireless communication.

Based on the above, even in the case of a game controller into which a vibration apparatus is built and wirelessly communicates with a game apparatus, vibration state data indicating a vibration state of a vibration apparatus is transmitted from the game controller to the game apparatus. Thus, the game apparatus can understand the vibration state of the vibration apparatus.

In an exemplary configuration of a vibration control apparatus according to the exemplary embodiment, a vibration control apparatus, in another apparatus for vibrating a vibration apparatus, controls the vibration. The vibration control apparatus includes a computer processor configured to: receive vibration state data indicating a vibration state of the vibration apparatus from the other apparatus; based on the received vibration state data, determine vibration instruction data for vibrating the vibration apparatus to be transmitted next to the other apparatus; and transmit the determined vibration instruction data to the other apparatus.

Based on the above, vibration state data indicating a vibration state of a vibration apparatus is transmitted from another apparatus for vibrating the vibration apparatus. Thus, a vibration control apparatus for controlling a vibration can understand the vibration state of the vibration apparatus.

Further, the exemplary embodiment may be carried out in the forms of a non-transitory computer-readable storage medium having stored therein a vibration control program and a vibration control method.

According to the exemplary embodiment, vibration state data indicating a vibration state of a vibration apparatus is transmitted to another apparatus. Thus, the other apparatus can understand the vibration state of the vibration apparatus.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 5 is a diagram showing a non-limiting example of an equable bit pattern used to generate a data sequence generated in response to the duty cycle of an AM/FM wave;

FIG. 10 is a diagram showing non-limiting examples of main data and programs stored in a memory 22 of the information processing apparatus 2 when a vibration control process is performed;

DETAILED DESCRIPTION OF NON-LIMITING EXAMPLE EMBODIMENTS

Figure 1:
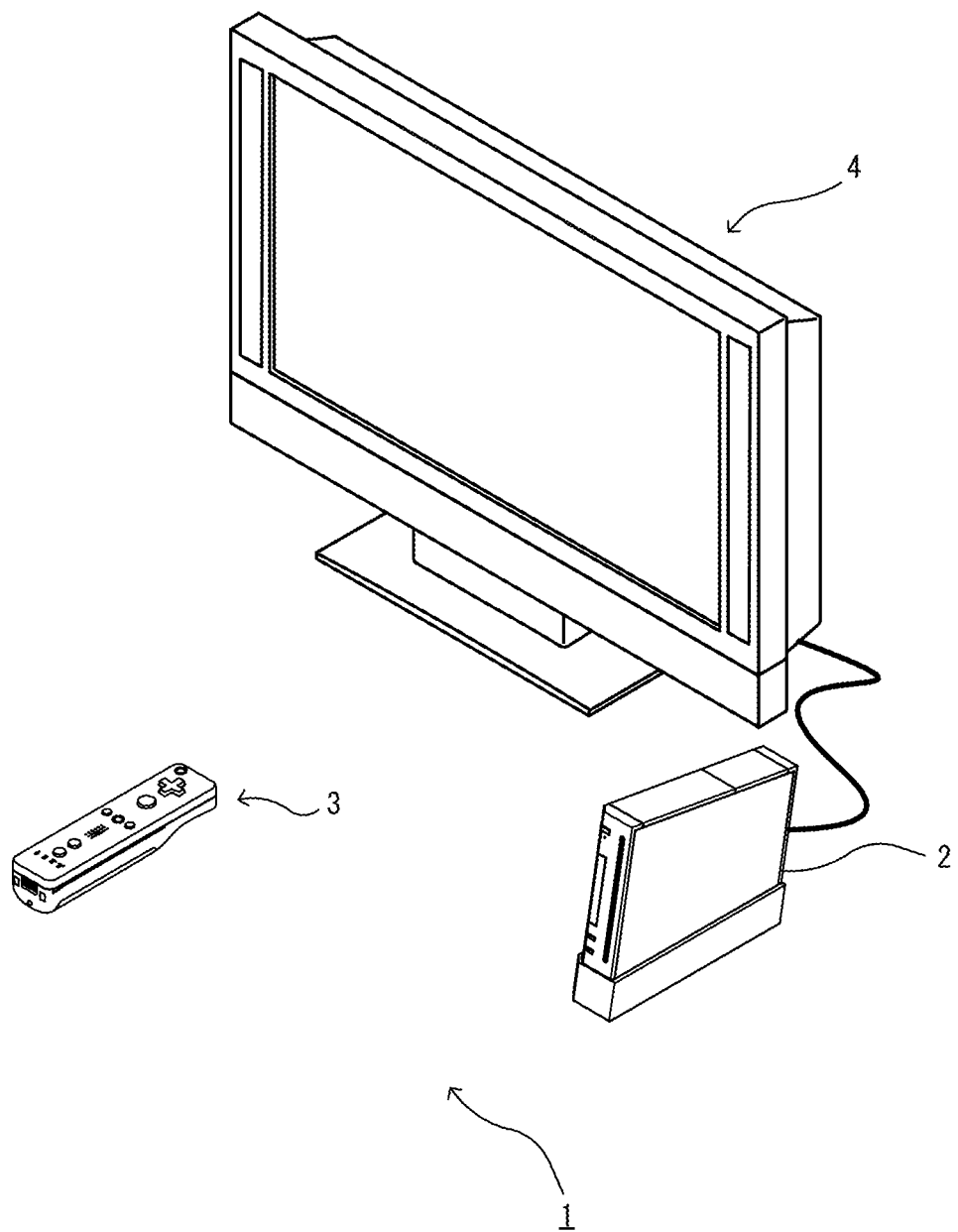
FIG. 1 is a perspective view showing non-limiting examples of the external appearances of a vibration control system 1, which includes a stationary information processing apparatus 2 and a controller-type terminal apparatus 3, and a monitor 4 according to an exemplary embodiment.
Figure 2:
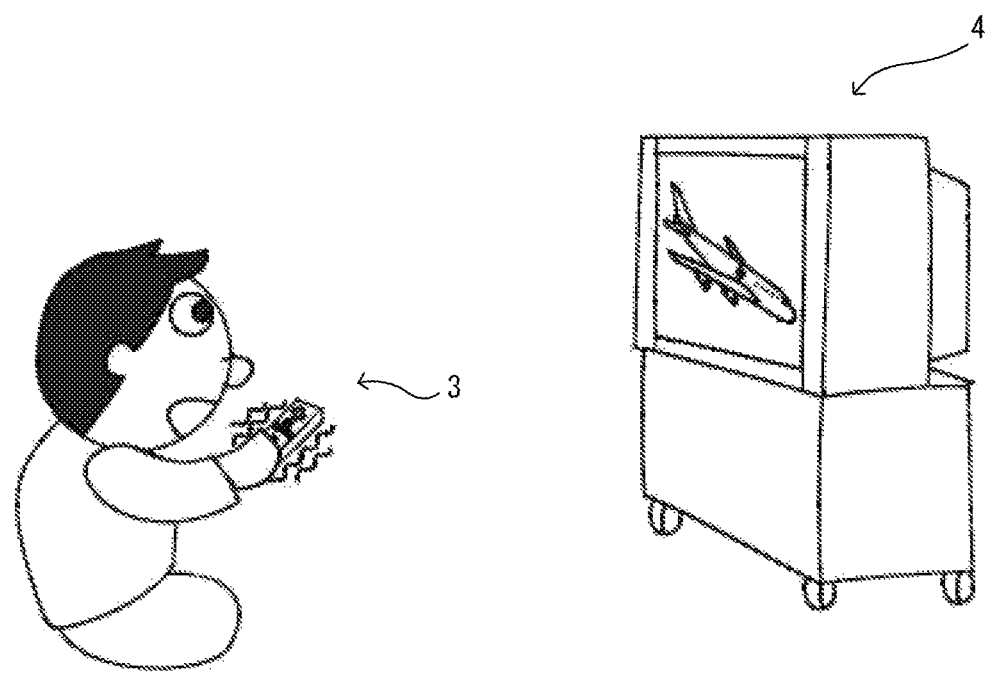
FIG. 2 is a diagram showing a non-limiting example of the state where a user performs an operation using the vibration control system 1.

With reference to FIGS. 1 and 2, a description is given of a vibration control system including a terminal apparatus for executing a vibration output program and an information processing apparatus for executing a vibration control program, according to an exemplary embodiment. It should be noted that FIG. 1 is a perspective view showing examples of the external appearances of a vibration control system 1, which includes a stationary information processing apparatus 2 and a controller-type (portable) terminal apparatus 3, and a monitor 4. FIG. 2 is a diagram showing an example of the state where a user performs an operation using the vibration control system 1.

While the vibration control program according to the exemplary embodiment can be applied by being executed by any computer system, the stationary information processing apparatus 2 is used as an example of the vibration control apparatus, and the vibration control program according to the exemplary embodiment is described using a vibration control program executed by the information processing apparatus 2. For example, the information processing apparatus 2 can execute a program stored in a storage medium such as an exchangeable optical disk or an exchangeable memory card, or received from another apparatus, or a pre-installed program (e.g., a game program). As an example, the information processing apparatus 2 can display on a screen (the monitor 4 in FIGS. 1 and 2) an image generated by a computer graphics process, such as a virtual space image viewed from a virtual camera set in a virtual space. The information processing apparatus 2 may be a device such as a general personal computer, a stationary game apparatus, a mobile phone, a mobile game apparatus, or a PDA (Personal Digital Assistant).

Further, although the vibration output program according to the exemplary embodiment can also be applied by being executed by any computer system, the controller-type terminal apparatus 3 (e.g., a game controller) that can be held and operated by a user is used as an example of the vibration output apparatus, and the vibration output program according to the exemplary embodiment is described using a vibration output program executed by the terminal apparatus 3. For example, the terminal apparatus 3 can execute a pre-installed program, a program received from another apparatus, or a program stored in a storage medium such as an exchangeable memory card. As an example, the terminal apparatus 3 wirelessly communicates with the information processing apparatus 2 and thereby can operate a virtual object or the like displayed on a screen (the monitor 4 in FIGS. 1 and 2). The terminal apparatus 3 may be a device in any form such as a mobile phone, a mobile game apparatus, a PDA, a smartphone, or a tablet. Further, the information processing apparatus 2 can communicate with the terminal apparatus 3. The communication between the information processing apparatus 3 and the information processing device 2 may be performed in a wired or wireless manner. Further, the connection between the information processing apparatus 2 and the monitor 4 may also be made in a wired or wireless manner.

In the information processing apparatus 2, the information processing apparatus 2 executes information processing in accordance with an input to the terminal apparatus 3, and an image obtained as a result of the execution of the information processing is displayed on the monitor 4. As described above, the exemplary embodiment uses a configuration in which an input function, an information processing function, and a display function are achieved by the information processing apparatus 2 and the terminal apparatus 3. Alternatively, in another exemplary embodiment, the functions of the information processing apparatus 2 and the terminal apparatus 3 may be achieved by another apparatus. For example, in another embodiment, a plurality of apparatuses capable of communicating with each other via a network (a wide area network and/or a local network) may perform in a dispersed manner at least part of the processing performed by the information processing apparatus 2 and the terminal apparatus 3.

Within the terminal apparatus 3, an actuator 30 (see FIG. 3) is provided. The actuator 30 is a vibration actuator (a vibrator) for imparting a predetermined vibration to the main body of the terminal apparatus 3. The actuator 30 vibrates and thereby can impart a vibration to the user operating the terminal apparatus 3. Further, in the terminal apparatus 3, an operation section including a direction indication key, an operation button, and the like is provided. As an example, the operation section may include a cross-shaped four-direction push switch (a directional pad), a touch panel, a touch pad, and the like. Further, in the operation section, four push switches may be disposed in cross directions, and the operation section may output an operation signal in accordance with a push switch pressed by the user. Further, in the operation section, aside from the above four push switches, a center switch may be disposed at the position where the cross directions intersect, and the four push switches and the center switch may be combined together. Further, in accordance with the tilt of a tiltable stick (a so-called joystick), the operation section may output an operation signal in accordance with the tilt direction. Further, in accordance with the slide of a horizontally movable disc-shaped member, the operation section may output an operation signal corresponding to the slide direction. Further, in the terminal apparatus 3, a display screen for displaying an image based on the control of the terminal apparatus 3 itself and/or the information processing apparatus 2 may be provided.

To operate the operation section or view the display screen using the terminal apparatus 3, the user holds the terminal apparatus 3 with one hand (e.g., the right hand) or both hands. Then, in accordance with the situation of a virtual world displayed on the monitor 4 or the like, the main body of the terminal apparatus 3 vibrates. For example, in the exemplary embodiment, vibration instruction data for generating a vibration control signal for generating this vibration is given to the terminal apparatus 3 by the information processing apparatus 2. For example, the information processing apparatus 2 wirelessly transmits vibration instruction data for giving an instruction to generate a vibration to the terminal apparatus 3 using Bluetooth (registered trademark) technology, for example. Then, based on the acquired vibration instruction data, the terminal apparatus 3 generates a vibration control signal for controlling the driving of the actuator 30. Further, the terminal apparatus 3 wirelessly transmits operation data indicating an operation on the operation section, and report data indicating the vibration output state of the terminal apparatus 3 or the like to the information processing apparatus 2 using Bluetooth technology, for example.

Figure 3:
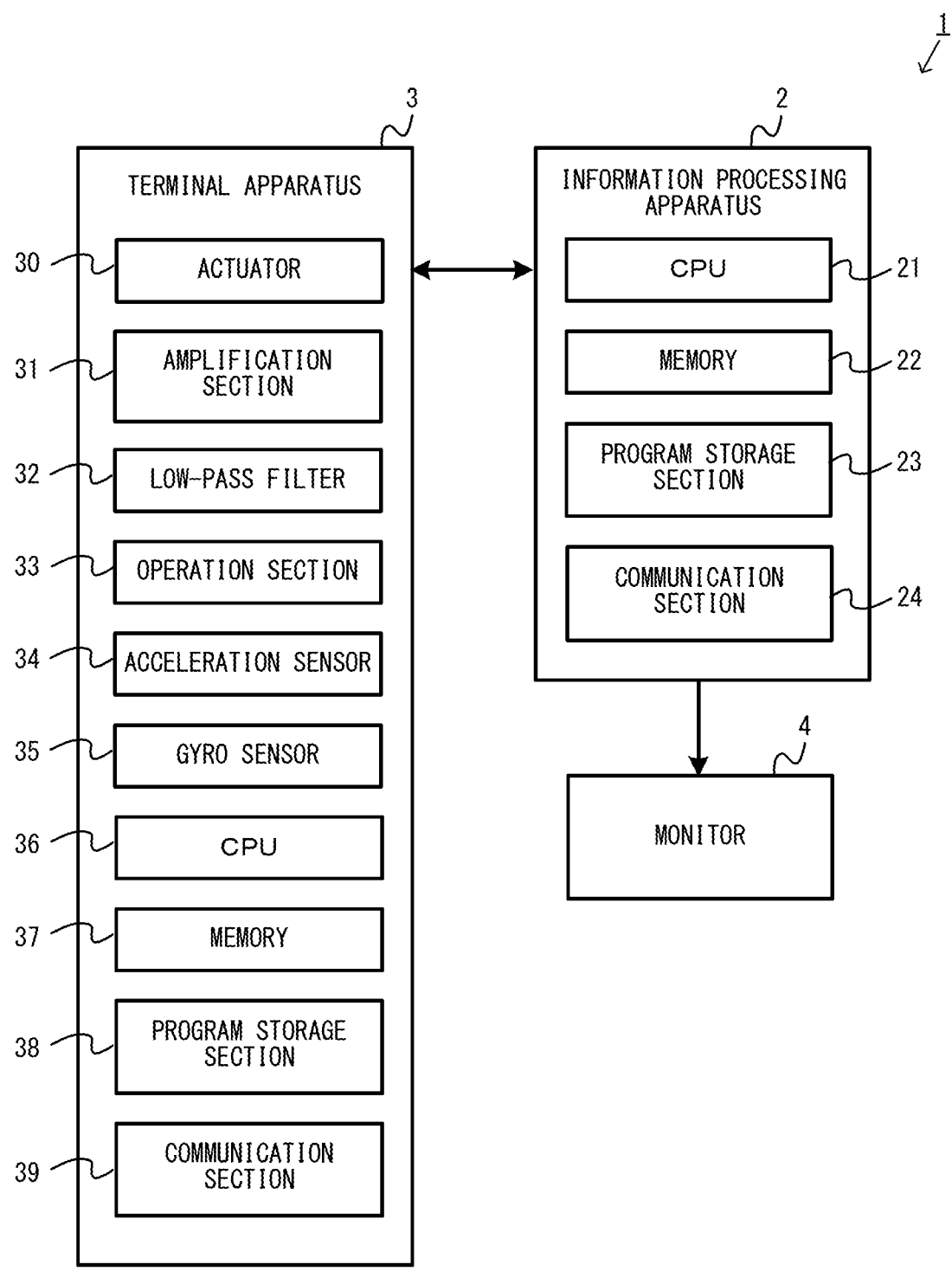
FIG. 3 is a block diagram showing a non-limiting example of the vibration control system 1, which includes the information processing apparatus 2 and the terminal apparatus 3.

Next, with reference to FIG. 3, a description is given of the vibration control system 1, which includes the information processing apparatus 2 and the terminal apparatus 3. It should be noted that FIG. 3 is a block diagram showing an example of the vibration control system 1, which includes the information processing apparatus 2 and the terminal apparatus 3.

As shown in FIG. 3, the information processing apparatus 2 includes a CPU 21, a memory 22, a program storage section 23, and a communication section 24. The CPU 21 executes a predetermined information processing program using the memory 22, thereby executing, for example, a vibration control process for generating vibration instruction data for giving an instruction to generate a vibration, and transmitting the vibration instruction data to the terminal apparatus 3, and a display control process for displaying on the monitor 4 an image of a virtual world where a player object appears. It should be noted that the information processing apparatus 2 may have any configuration so long as the information processing apparatus 2 can perform information processing. For example, a part or all of information processing may be performed by a dedicated circuit.

The program storage section 23 stores the information processing program. The program storage section 23 is any storage device accessible by the CPU 21. The program storage section 23 may be a storage section built into the information processing apparatus 2, such as a hard disk, or may be a storage section attachable to and detachable from the information processing apparatus 2, such as an optical disk. Alternatively, the program storage section 23 may be a storage device (a server or the like) connected to the CPU 21 via a network. The CPU 21 may load a part or all of the program into the memory 22 at appropriate timing and execute the loaded program.

The communication section 24 functions as a wireless controller module for wirelessly communicating with the terminal apparatus 3. The communication section 24 transmits vibration instruction data or the like to the terminal apparatus 3 at predetermined timing or repeatedly receives report data, operation data, and the like from the terminal apparatus 3.

The terminal apparatus 3 includes, as an input section for receiving an operation of the user and generating operation data representing the operation of the user, an acceleration sensor 34 and a gyro sensor 35 in addition to an operation section 33. The acceleration sensor 34 and the gyro sensor 35 are examples of a sensor for calculating the motion and the orientation of the terminal apparatus 3. For example, the terminal apparatus 3 may include a three-axis acceleration sensor 34. The three-axis acceleration sensor 34 detects linear accelerations generated in three directions, i.e., an up-down direction, a left-right direction, and a front-back direction. Further, the terminal apparatus 3 may include a three-axis gyro sensor 35. The three-axis acceleration sensor 35 detects angular velocities generated about three directions, i.e., the up-down direction, the left-right direction, the front-back direction. It should be noted that the terminal apparatus 3 may include a magnetic sensor as a sensor for calculating the motion and the orientation of the terminal apparatus 3.

The terminal apparatus 3 includes a CPU 36, a memory 37, a program storage section 38, and a communication section 39. The CPU 36 executes the vibration output program using the memory 37, thereby performing a vibration output process for imparting, to the user operating the terminal apparatus 3, a vibration based on vibration instruction data acquired from the information processing apparatus 2. For example, as an example of the vibration output process, the CPU 36 receives vibration instruction data transferred from the information processing apparatus 2 via the communication section 39, generates a vibration control signal for controlling a vibration to be generated by the actuator 30 based on the vibration instruction data (e.g., a vibration control signal indicating an analog voltage value), and outputs the vibration control signal to a low-pass filter 32. It should be noted that the terminal apparatus 3 may have any configuration so long as the terminal apparatus 3 can perform the vibration output process. For example, a part or all of the vibration output process may be executed by a dedicated circuit.

The program storage section 38 stores the vibration output program. The program storage section 38 may be any storage device accessible by the CPU 36. The program storage section 38 may be a storage section attachable to and detachable from the terminal apparatus 3. Alternatively, the program storage section 38 may be a storage device (a server or the like) connected to the CPU 36 via a network. The CPU 36 may load a part or all of the program into the memory 37 at appropriate timing and execute the loaded program.

The communication section 39 functions as a wireless controller module for wirelessly communicating with the information processing apparatus 2. The communication section 39 transmits report data indicating the vibration output state of the terminal apparatus 3, operation data generated by at least one of the operation section 33, the acceleration sensor 34, and the gyro sensor 35, and the like to the information processing apparatus 2. The above operation data is transmitted from the terminal apparatus 3 to the information processing apparatus 2 repeatedly, for example, once every certain time. The information processing apparatus 2 performs the above information processing using report data and operation data as inputs.

The terminal apparatus 3 includes a vibration output section for generating a vibration to be imparted to the user. For example, the vibration generation section includes an actuator (vibrator) 30, an amplification section 31, and a low-pass filter 32.

The low-pass filter 32 performs the process of acquiring a vibration control signal output from the CPU 36 and decreasing a frequency component higher than a predetermined frequency, thereby converting the vibration control signal into an analog value. Then, the analog value outputs the analog value to the amplification section 31. The amplification section 31 amplifies the analog value (a signal indicating an analog voltage value) output from the low-pass filter 32, thereby generating a driving signal for driving the actuator 30. Then, the amplification section 31 outputs the driving signal to the actuator 30.

The actuator 30 is driven in accordance with the driving signal output from the amplification section 31, thereby imparting a vibration corresponding to the driving signal to the main body of the terminal apparatus 3. For example, the actuator 30 is provided near a center portion of the main body of the terminal apparatus 3. Here, the method of the actuator 30 imparting a vibration to the main body of the terminal apparatus 3 may be any method. For example, the actuator 30 may use the method of generating a vibration by an eccentric motor (ERM: Eccentric Rotating Mass), the method of generating a vibration by a linear vibrator (LRA: Linear Resonant Actuator), the method of generating a vibration by a piezoelectric element, or the like. When a driving signal to be output from the amplification section 31 is generated in accordance with the method of the actuator 30 generating a vibration, an actuator using any method can impart various vibrations to the user of the terminal apparatus 3.

It should be noted that in the above description, an example has been used where a driving signal for driving the actuator 30 is generated by amplifying the analog value generated by the low-pass filter 32. Alternatively, the signal output to the amplification section 31 may be a digital signal. For example, when the actuator 30 is driven by pulse width modulation (PWM) control, a pulse signal for turning on and off the actuator 30 may be input to the amplification section 31. In this case, the signal output to the amplification section 31 is a digital vibration signal for controlling the driving of the actuator 30 using pulse waves. Consequently, the amplification section 31 amplifies the digital vibration signal.

The monitor 4 is an example of a display device for displaying a generated image and outputting a generated sound. The monitor 4 can acquire data transmitted from the information processing apparatus 2. When an image generated by the information processing apparatus 2 is output to the monitor 4, the monitor 4 displays the image.

It should be noted that in the exemplary embodiment, the controller-type terminal apparatus 3, in which an input device is provided, is used. Alternatively, in another exemplary embodiment, the terminal apparatus 3 may be a device obtained by integrating a display device and an input device. In this case, the terminal apparatus 3 may function as an input device and a display device, and the information processing apparatus 2 may cause an image to be displayed on the monitor 4 and the display device provided in the terminal apparatus 3.

Figure 4:
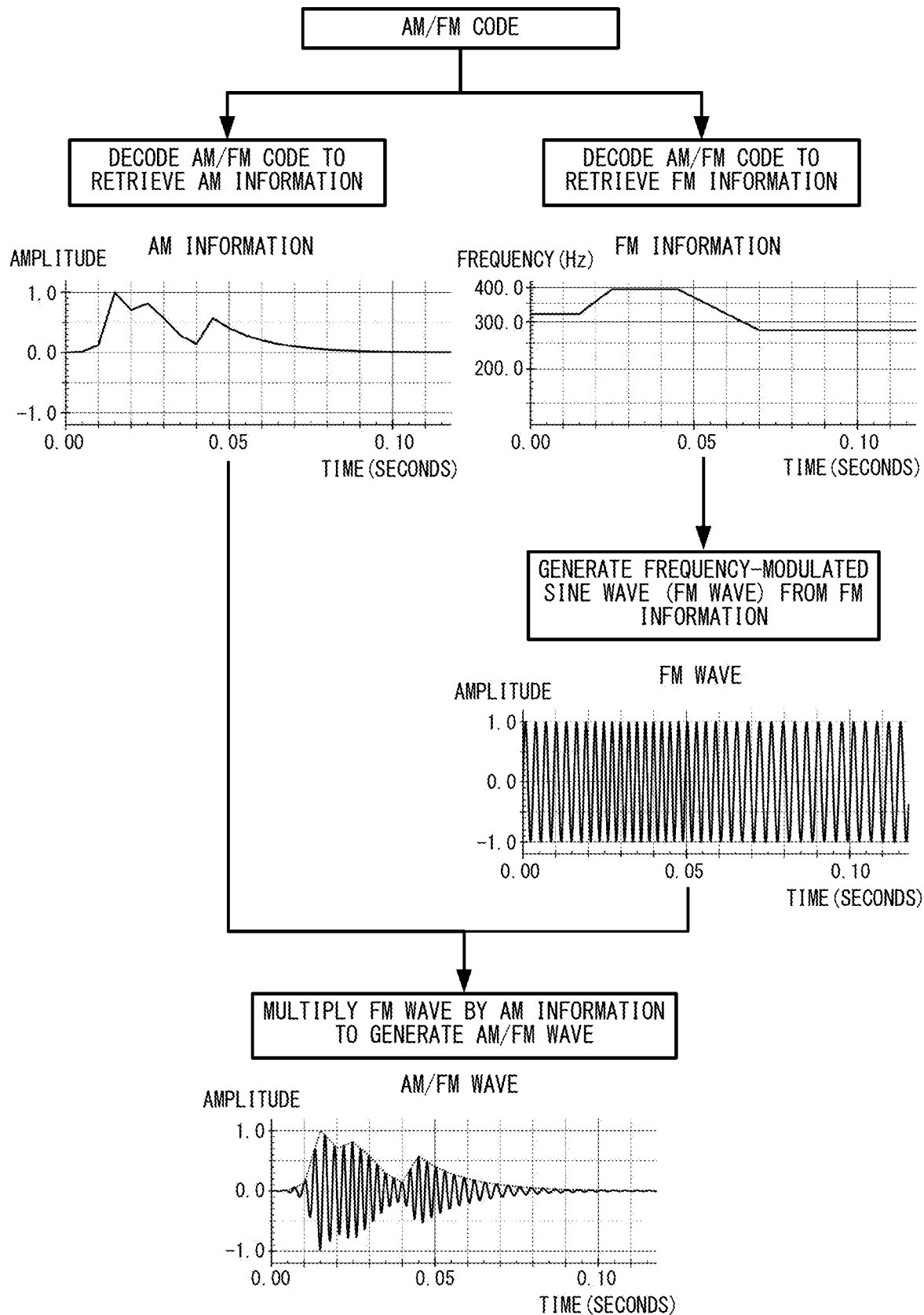
FIG. 4 is a diagram illustrating a non-limiting example of the process of generating an AM/FM wave based on AM/FM code data.
Figure 6:
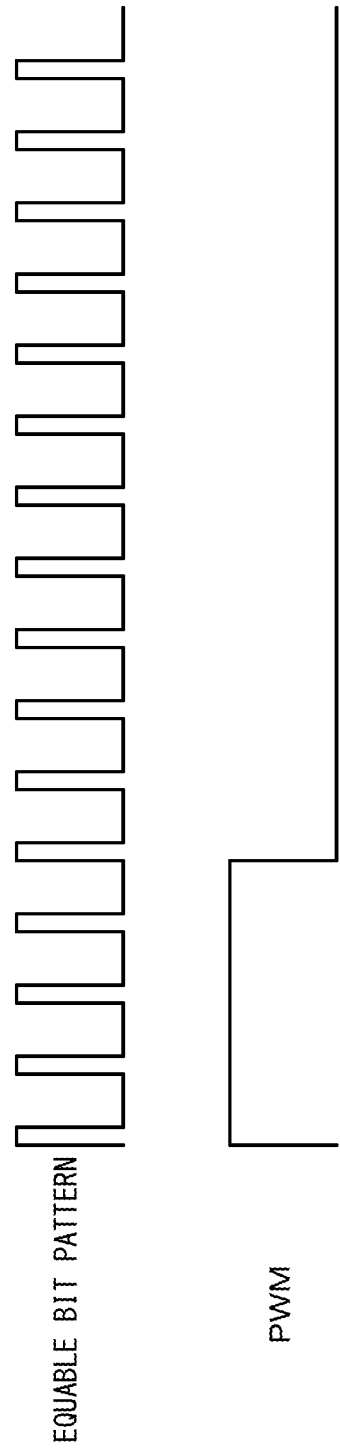
FIG. 6 is a diagram showing a non-limiting example of a data sequence generated using an equable bit pattern corresponding to a 25% duty cycle.
Figure 7:
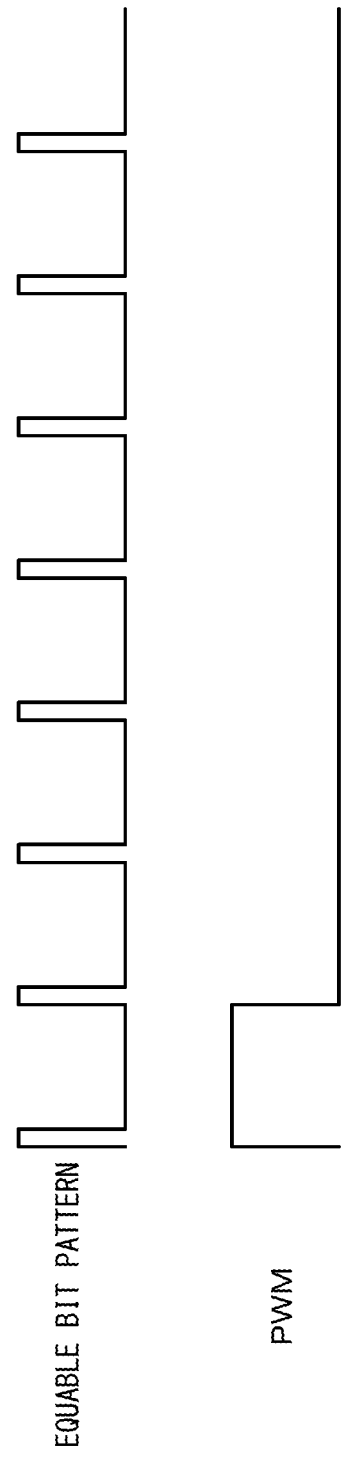
FIG. 7 is a diagram showing a non-limiting example of a data sequence generated using an equable bit pattern corresponding to a 12.5% duty cycle.
Figure 8:
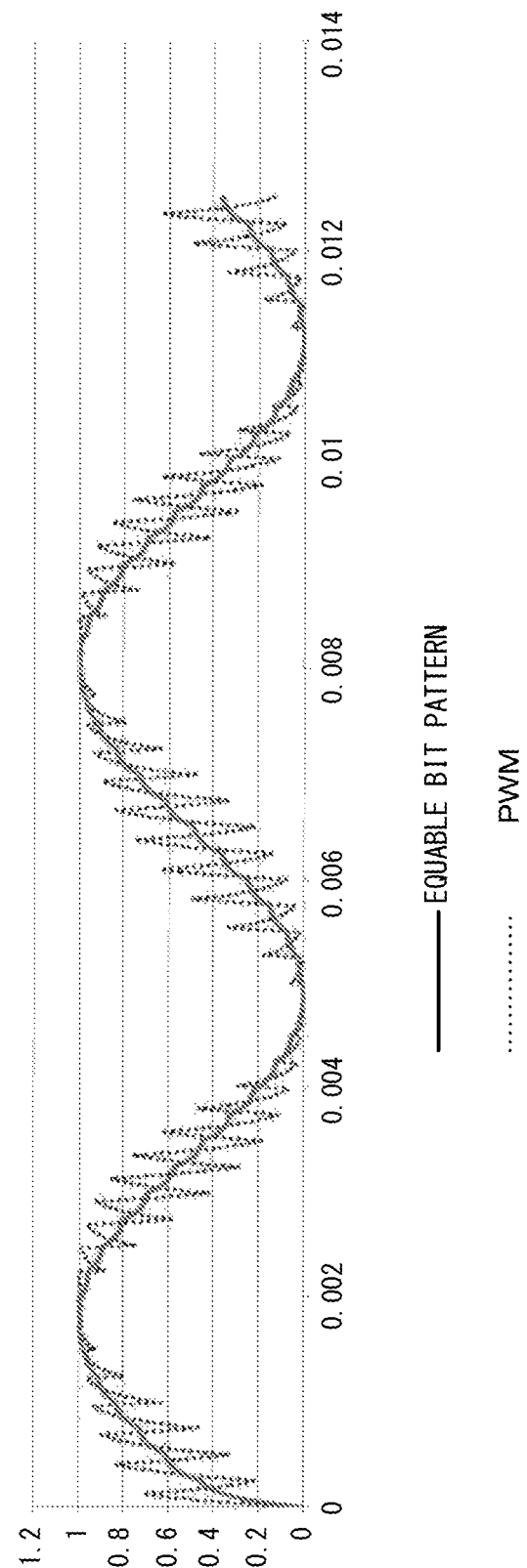
FIG. 8 is a diagram showing a non-limiting example of an analog waveform generated using an equable bit pattern.

Next, with reference to FIGS. 4 to 8, a description is given of an example of the process of generating a vibration control signal. It should be noted that FIG. 4 is a diagram illustrating an example of the process of generating an AM/FM wave based on AM/FM code data. FIG. 5 is a diagram showing an example of an equable bit pattern used to generate a data sequence to be generated in response to the duty cycle of an AM/FM wave. FIG. 6 is a diagram showing an example of a data sequence generated using an equable bit pattern corresponding to a 25% duty cycle. FIG. 7 is a diagram showing an example of a data sequence generated using an equable bit pattern corresponding to a 12.5% duty cycle. FIG. 8 is a diagram showing an example of an analog waveform generated using an equable bit pattern.

A vibration control signal for controlling a vibration to be generated by the actuator 30 is generated based on vibration instruction data transmitted from the information processing apparatus 2. In the exemplary embodiment, the terminal apparatus 3 receives, as vibration instruction data, AM/FM code data transmitted from the information processing apparatus 2 and decodes the AM/FM code data, thereby generating vibration waveform (AM/FM wave) data. Then, a bit pattern corresponding to the duty cycle of this vibration waveform (AM/FM wave) is used as a vibration control signal. Here, AM code data indicates data representing the amplitude modulation of a vibration. FM code data indicates data representing the frequency modulation of a vibration. AM/FM code data indicates data representing both the amplitude modulation and the frequency modulation of a vibration. Then, an AM/FM wave indicates a vibration waveform amplitude-modulated and frequency-modulated based on AM/FM code data.

As shown in FIG. 4, AM/FM code data is transmitted as vibration instruction data from the information processing apparatus 2 in each certain update cycle (e.g., every 5 msec) of modulating a vibration and functions as a command for updating the amplitude and the frequency. Then, the AM/FM code data is decoded using a predetermined encoding table, thereby retrieving AM information and FM information. Here, the AM information is information indicating the amplitude of the vibration after an update, based on the vibration before the update. Such AM information is analyzed in each update cycle described above, whereby it is possible to acquire information as shown in FIG. 4 for modulating the amplitude of the vibration in a time-series manner based on a predetermined amplitude. Further, the FM information is information indicating the frequency of the vibration after the update, based on the frequency of the vibration before the update. Such FM information is analyzed in each update cycle described above, whereby it is possible to acquire information as shown in FIG. 4 for modulating the frequency of the vibration in a time-series manner based on a predetermined frequency.

Next, a frequency-modulated sine wave (an FM wave) is generated from the FM information. Here, the FM wave is a sine wave as shown in FIG. 4 that is displaced with a frequency corresponding to the FM information acquired in each update cycle described above.

Then, the FM wave is multiplied by the AM information, thereby generating an AM/FM wave. Here, the AM/FM wave has a waveform as shown in FIG. 4 that is displaced with a frequency corresponding to the FM information acquired in each update cycle described above, and also with an amplitude corresponding to the AM information acquired in each update cycle described above. Then, vibration waveform data indicating the generated AM/FM wave is stored in a vibration waveform data buffer set in the memory 37. A vibration control signal indicating a bit pattern corresponding to the duty cycle of the thus generated AM/FM wave is generated, whereby it is possible to vibrate the actuator 30 with a frequency and an amplitude indicated by the AM/FM wave.

It should be noted that to reduce the amount of communication data between the information processing apparatus 2 and the terminal apparatus 3, vibration instruction data transmitted from the information processing apparatus 2 may be transmitted in a cycle longer than the above certain update cycle. For example, when a vibration instruction based on the same vibration value continues to be transmitted from the information processing apparatus 2, the transmission of vibration instruction data indicating the vibration based on the same vibration value may be omitted, and the transmission cycle may be made relatively long (e.g., every 0.5 sec). As will be apparent later, on the terminal apparatus 3 side, when the remaining amount of vibration waveform data generated based on vibration instruction data becomes less than a predetermined threshold, the process of adding vibration waveform data based on the vibration instruction data received last is performed. Thus, even when the transmission cycle is made relatively long, the terminal apparatus 3 can continue to vibrate. Further, when the terminal apparatus 3 does not vibrate, the information processing apparatus 2 may not transmit vibration instruction data, or may transmit vibration instruction data indicating that the terminal apparatus 3 does not vibrate.

Vibration instruction data is transmitted by such an AM/FM transmission method, whereby it is possible to expect the following effects. As a first effect, it is possible to reduce the amount of data communication for transmitting vibration instruction data as compared to a method for transmitting vibration instruction data as it is, a method for transmitting vibration instruction data by lowering the sampling rate of the vibration instruction data, and a method for transmitting vibration instruction data by compressing the vibration instruction data by a predetermined method. As a second effect, the processing load for decoding the transmitted AM/FM code data is relatively low, and therefore, it is possible to perform the decoding process in real time and lead to controlling the vibration of the actuator 30. As a third effect, parameters for controlling the vibration are the frequency and the amplitude, and therefore, it is possible to simplify the work of generating a vibration material. As a fourth effect, the frequency of the vibration controlled by the AM/FM transmission method is set near the resonance frequency of the actuator 30, whereby it is possible to impart a relatively strong (power-efficient) vibration to the user. It should be noted that if these effects are not desired, vibration instruction data may be transmitted to the terminal apparatus 3 by a transmission method different from the AM/FM transmission method.

Further, in the above AM/FM transmission method, the AM/FM code data may be transmitted with respect to each frequency range. For example, the AM/FM code data is transmitted from the information processing apparatus 2 with respect to each of a plurality of frequency ranges in the certain update cycle of modulating a vibration and functions as a command for updating the amplitude and the frequency of a vibration with respect to each frequency range. For example, a set of AM/FM code data targeted for a low-frequency range (e.g., the 160 Hz band) and AM/FM code data targeted for a high-frequency range (e.g., the 320 Hz band) is transmitted as the vibration instruction data from the information processing apparatus 2.

The AM/FM code data targeted for the low-frequency range is decoded using the predetermined encoding table similarly to the above process, thereby retrieving AM information and FM information and generating an FM wave from the FM information. Then, the FM wave is multiplied by the AM information targeted for the low-frequency range, thereby generating an AM/FM wave targeted for the low-frequency range.

Meanwhile, the AM/FM code data targeted for the high-frequency range is also decoded using the predetermined encoding table similarly to the above process, thereby retrieving AM information and FM information and generating an FM wave from the FM information. Then, the FM wave is multiplied by the AM information targeted for the high-frequency range, thereby generating an AM/FM wave targeted for the high-frequency range.

Then, the AM/FM wave targeted for the low-frequency range and the AM/FM wave targeted for the high-frequency range are summed up, thereby generating a combined wave. Then, vibration waveform data indicating the generated combined wave is stored in the vibration waveform data buffer set in the memory 37. The combined wave has both the AM/FM information targeted for the low-frequency range and the AM/FM information targeted for the high-frequency range and therefore has a vibration waveform that is displaced based on information of the frequency and information of the amplitude for a plurality of frequency ranges. A vibration control signal is generated using a bit pattern corresponding to the duty cycle of the thus generated combined wave, whereby it is possible to vibrate the actuator 30 with a frequency and an amplitude indicated by the combined wave.

When vibration data is thus transmitted by the AM/FM transmission method with respect to each of a plurality of frequency ranges, it is possible to transfer a change in the frequency and a change in the amplitude with respect to each of the plurality of frequency ranges. Thus, it is possible to transmit the vibration from the information processing apparatus 2 to the terminal apparatus 3 more accurately. Thus, it is possible to transmit vibration waveform data without causing the deterioration of vibrating sensation to be imparted to the user as compared to another transmission method.

Next, with reference to FIGS. 5 to 8, a description is given of an example of the process of generating a vibration control signal from vibration waveform data stored in the vibration waveform data buffer. In the exemplary embodiment, vibration waveform data (an AM/FM wave) stored in the vibration waveform data buffer is sequentially read, a bit pattern corresponding to the duty cycle of this vibration waveform is generated as a vibration control signal, and the vibration control signal is output to the amplification section 31 via the low-pass filter 32, thereby driving the actuator 30.

For example, using an equable bit pattern conversion table as shown in FIG. 5, vibration waveform data stored in the vibration waveform data buffer is sequentially converted into a vibration control signal. An equable bit pattern is described below.

In an N-bit binary number, an equable bit pattern represented by m "1"s and N-m "0"s is referred to as an "(N, m)-bit pattern" (here, $0 \leq m \leq N$). Then, when $a\_\{N, m\}$ in the (N, m)-bit pattern is represented by an N-bit binary number, the bit of the k-th highest digit is defined as $b\_\{N, m, k\}$ (here $0 \leq k \leq N-1$). In this case, $a\_\{N, m\}$ is represented in binary notation as:

$a\_\{N, m\} = b\_\{N, m, 0\}, b\_\{N, m, 1\} \ldots, b\_\{N, m, N-1\}$

At this time, $b\_\{N, m, k\}$ is defined as:

$b\_\{N, m, k\} = 1$ when [km/N] does not coincide with [(k−1)m/N]

$b\_\{N, m, k\} = 0$ when [km/N] coincides with [(k−1)m/N]

Thus, $a\_\{N, m\}$ is an (N, m)-equable bit pattern. It should be noted that [x] represents a maximum integer that does not exceed x (i.e., Gauss's notation).

FIG. 5 shows an example of an equable bit pattern when N=16. For example, when the data sequence of a 25% duty cycle is to be output as a vibration control signal, a data sequence represented by four "1"s and twelve "0"s is output. At this time, a (16, 4)-equable bit pattern represented by four "1"s and twelve "0"s is:

$a\_\{16, 4\} = 1000\ 1000\ 1000\ 1000$

Thus, as shown in FIG. 6, when N=64, in the case of an equable bit pattern, the data sequence of a 25% duty cycle is represented in hexadecimal notation as:

{0x88, 0x88, 0x88, 0x88, 0x88, 0x88, 0x88, 0x88}

On the other hand, a general PWM data sequence is represented in hexadecimal notation as:

{0xFF, 0xFF, 0x00, 0x00, 0x00, 0x00, 0x00, 0x00}

Further, when the data sequence of a 12.5% duty cycle is to be output as a vibration control signal, a data sequence represented by two "1"s and fourteen "0"s is output. At this time, a (16, 2)-equable bit pattern represented by two "1"s and fourteen "0"s is:

$a\_\{16, 2\} = 1000\ 0000\ 1000\ 0000$

Thus, as shown in FIG. 7, when N=64, in the case of an equable bit pattern, the data sequence of a 12.5% duty cycle is represented in hexadecimal notation as:

{0x80, 0x80, 0x80, 0x80, 0x80, 0x80, 0x80, 0x80}

On the other hand, a general PWM data sequence is represented in hexadecimal notation as:

{0xFF, 0x00, 0x00, 0x00, 0x00, 0x00, 0x00, 0x00}

As is clear from FIGS. 6 and 7, when N=64, the data sequence of a vibration control signal is generated using an equable bit pattern, whereby it is possible to make the frequency of appearance of codes "0" and "1" relatively equable. Thus, as shown in FIG. 8, it is possible to reduce the noise of an analog waveform generated from a vibration control signal using an equable bit pattern and output a stable analog waveform to the amplification section 31. The analog waveform from which the noise is thus reduced is output, whereby it is possible to generate an intended vibration from the actuator 30. Further, in the case of a 25% duty cycle (a sample value is 0.25) shown in FIG. 6, 0xFF, 0xFF, 0x00, 0x00, 0x00, 0x00, 0x00, and 0x00 are output in a PWM data sequence, whereas 0x88, 0x88, 0x88, 0x88, 0x88, 0x88, 0x88, and 0x88 are output in an equable bit pattern. This indicates that an effect similar to that of an increase in the carrier frequency of PWM by 16 times is obtained using an equable bit pattern. Further, when a vibration control signal converted into such an equable bit pattern is used, the vibration control signal is output from a data line used in I2S protocol and is converted into an analog value by the low-pass filter 32, whereby it is possible to use the analog value as a PWM output. Thus, a vibration control signal converted into an equable bit pattern is used, whereby it is possible to configure the amplification section 31 using a low-cost analog amplifier without using a high-cost I2S amplifier.

Figure 9:
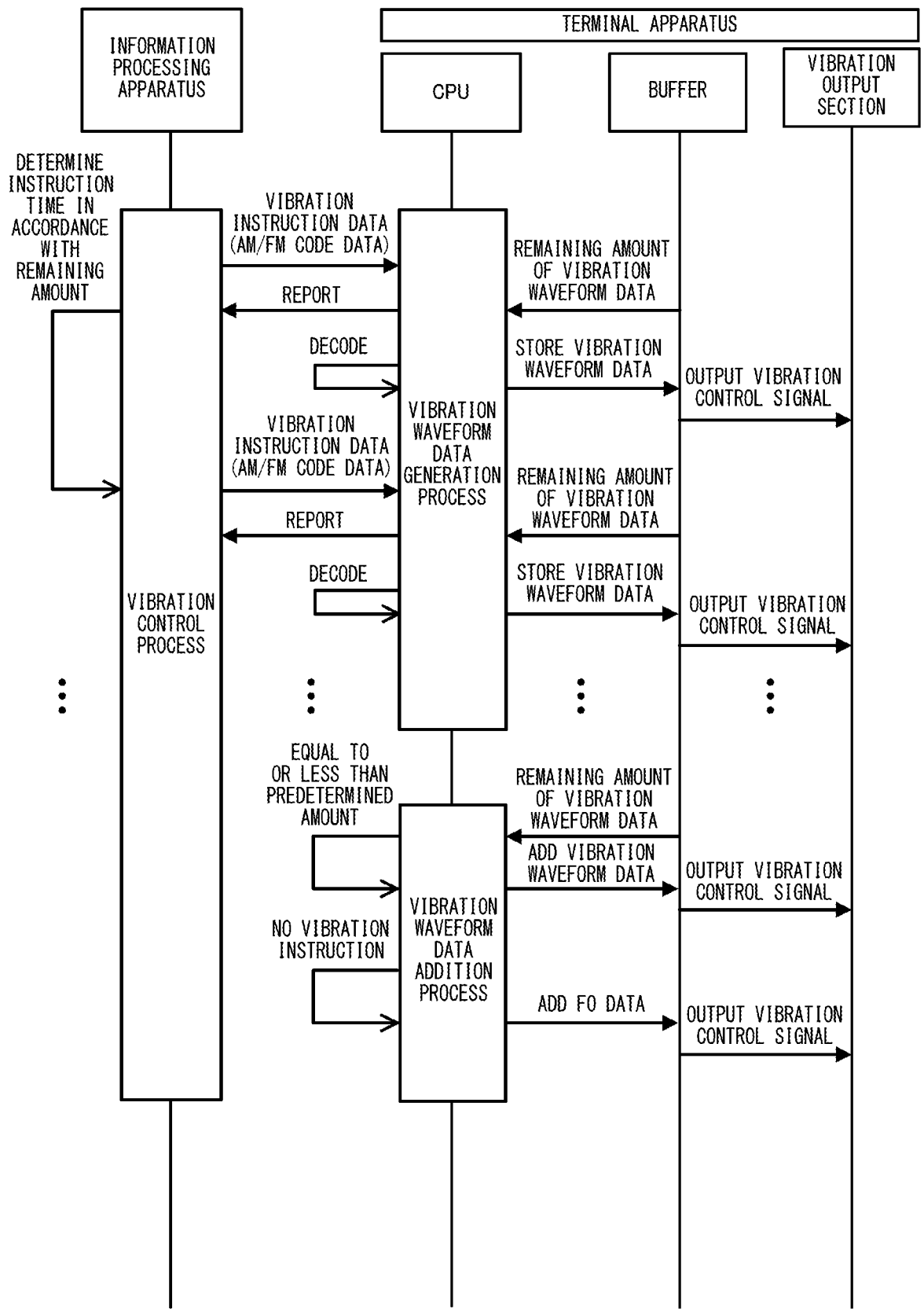
FIG. 9 is a diagram showing a non-limiting example of the procedure in which data is handled in the information processing apparatus 2 and the terminal apparatus 3.

Next, with reference to FIG. 9, a description is given of an example of the procedure in which data is handled in the information processing apparatus 2 and the terminal apparatus 3. It should be noted that FIG. 9 is a diagram showing an example of the procedure in which data is handled in the information processing apparatus 2 and the terminal apparatus 3.

In FIG. 9, when vibrating the terminal apparatus 3, the information processing apparatus 2 generates, as vibration instruction data, AM/FM code data for giving an instruction to generate the vibration and transmits the AM/FM code data to the terminal apparatus 3. For example, in the information processing apparatus 2, original vibration waveform data for which the instruction is to be given is prepared. Then, when transmitting AM/FM code data with respect to each of a plurality of frequency ranges, the information processing apparatus 2 generates vibration waveform data of each frequency range component through a bandpass filter for each frequency range and generates the envelope waveform of this vibration waveform of each frequency range. Further, the information processing apparatus 2 encodes the result of the frequency analysis of the vibration waveform data of each frequency range, using the predetermined encoding table, thereby generating FM information indicating a change in the frequency with respect to each frequency range. Then, the information processing apparatus 2 encodes the general shape of the envelope waveform and the FM information with respect to each frequency range, thereby generating AM/FM code data. For example, based on the generated general shape of the envelope waveform and the generated FM information, the CPU 21 of the information processing apparatus 2 calculates the amount of change in the amplitude and the amount of change in the frequency with respect to each frequency range component. Further, based on the predetermined encoding table, the CPU 21 of the information processing apparatus 2 encodes the calculated amount of change in the amplitude and the calculated amount of change in the frequency, thereby generating AM/FM code data corresponding to a predetermined vibration length with respect to each frequency range. Then, the information processing apparatus 2 transmits the AM/FM code data to the terminal apparatus 3. It should be noted that the above process of encoding AM/FM code data may be analyzed and prepared in advance in an offline process by the information processing apparatus 2.

A vibration time indicated to the terminal apparatus 3 by the information processing apparatus 2 is set based on the transmission cycle of vibration instruction data, but can be changed in accordance with the vibration state of the terminal apparatus 3. For example, the information processing apparatus 2 can set the vibration time to be indicated to the terminal apparatus 3 between times of 0 ms to 15 ms (e.g., which correspond to 0 to 60 samples of vibration waveform data to be generated by the terminal apparatus 3). Further, vibration instruction data is generated by the information processing apparatus 2 and transmitted from the information processing apparatus 2 to the terminal apparatus 3 every predetermined transmission cycle (e.g., every 5 ms). Then, to stop a vibration, data indicating the stop of the vibration (e.g., data indicating a vibration of which the amplitude is 0)

is transmitted, and the transmission of vibration instruction data is stopped after that. It should be noted that the process of adding vibration waveform data when a predetermined condition is satisfied in the terminal apparatus 3 is automatically performed, the transmission cycle of transmitting vibration instruction data from the information processing apparatus 2 to the terminal apparatus 3 may be made longer (e.g., 0.5 s) than the longest time of the vibration time that can be indicated, and also when the amplitude and/or the frequency of a vibration for which an instruction is given change, vibration instruction data indicating the changes may be transmitted from the information processing apparatus 2. Here, the vibration instruction data transmitted when the amplitude and/or the frequency of a vibration for which an instruction is given change may be transmitted to the terminal apparatus 3 at timing different from the transmission cycle.

In accordance with the fact that the vibration instruction data (the AM/FM code data) is received from the information processing apparatus 2, the CPU 36 of the terminal apparatus 3 transmits report data to the information processing apparatus 2. For example, when the report data is transmitted, the CPU 36 acquires, as an example of information indicating the vibration state of the terminal apparatus 3, the remaining amount of vibration waveform data stored in the vibration waveform data buffer set in the memory 37. Further, between the transmission of the previous report data and the transmission of the current report data, the CPU 36 acquires data indicating whether or not the current state is the state where the remaining amount of vibration waveform data stored in the vibration waveform data buffer is less than a predetermined amount (remaining amount deficiency flag data). Then, the CPU 36 generates report data including at least the remaining amount of vibration waveform data and data indicating whether or not the remaining amount of vibration waveform data is less than the predetermined amount. Then, the CPU 36 transmits the report data to the information processing apparatus 2. It should be noted that the report data may be transmitted from the terminal apparatus 3 at timing other than the time when the vibration instruction data is received from the information processing apparatus 2. For example, report data may be transmitted in each certain cycle not related to the reception of vibration instruction data. Alternatively, report data may be transmitted by being included in another piece of data to be sent from the terminal apparatus 3 (e.g., operation data of an operation on the operation section 31, detection data of the acceleration sensor 35, or detection data of the gyro sensor 35).

Then, the CPU 36 of the terminal apparatus 3 decodes the received AM/FM code data, thereby generating vibration waveform data. Then, the CPU 36 stores the vibration waveform data in the vibration waveform data buffer set in the memory 37. For example, if receiving AM/FM code data corresponding to 20 samples of vibration waveform data, the CPU 36 decodes the AM/FM code data into vibration waveform data (AM/FM wave data) corresponding to 20 samples and adds the vibration waveform data as new data to vibration waveform data already stored in the vibration waveform data buffer. It should be noted that if receiving vibration instruction data corresponding to 0 samples of vibration waveform data, the CPU 36 skips the above decoding process and the above vibration waveform data storage process.

Vibration waveform data stored in the vibration waveform data buffer is sequentially read by the CPU 36 and converted into a vibration control signal. Then, the vibration control signal is output to the vibration output section (the low-pass filter 32). At this time, vibration waveform data stored in the vibration waveform data buffer is read by an FIFO method, and the read data is sequentially erased from the vibration waveform data buffer.

It should be noted that in the above example, as an example of the information indicating the vibration state of the terminal apparatus 3 included in the report data, data indicating the remaining amount of vibration waveform data stored in the vibration waveform data buffer is used. Alternatively, another piece of data may be used. For example, data indicating data free space in the vibration waveform data buffer, data indicating the amount of data consumed in the vibration waveform data buffer, or data indicating the remaining time until the amount of vibration waveform data in the vibration waveform data buffer becomes 0 may be the information indicating the vibration state included in the report data. Alternatively, data indicating whether or not the terminal apparatus 3 vibrates when the report data is transmitted, or data indicating a vibration parameter for the vibration of the terminal apparatus 3 when the report data is transmitted (e.g., the amplitude and the frequency of the vibration) may be the information indicating the vibration state included in the report data. Yet alternatively, data indicating the value of a clock (e.g., a clock frequency) used in the terminal apparatus 3 may be the information indicating the vibration state included in the report data. For example, when there is a lag between the clock of the information processing apparatus 2 and the clock of the terminal apparatus 3, it is possible that the time in which the terminal apparatus 3 actually vibrates is shorter or longer than the vibration time indicated by the information processing apparatus 2. A shift in the vibration state due to such a lag in time between clocks can be estimated by comparing the clock value of the information processing apparatus 2 with the clock value of the terminal apparatus 3. Thus, it is possible to use, as the information indicating the vibration state of the terminal apparatus 3, the value of the clock used in the terminal apparatus 3.

Receiving the report data, then based on the information indicating the vibration state of the terminal apparatus 3 included in the report data, the information processing apparatus 2 adjusts the vibration time in vibration instruction data to be transmitted next. For example, when the remaining amount of vibration waveform data stored in the vibration waveform data buffer is larger than an assumed amount, the CPU 21 adjusts the vibration time in the vibration instruction data to be transmitted next to be short. Further, when the remaining amount of vibration waveform data stored in the vibration waveform data buffer is smaller than the assumed amount, the CPU 21 adjusts the vibration time in the vibration instruction data to be transmitted next to be long. Further, when the state where the remaining amount of vibration waveform data stored in the vibration waveform data buffer becomes less than the predetermined amount occurs at unexpected timing, the vibration time in the vibration instruction data to be transmitted next is adjusted to be long, or the transmission timing of the next vibration instruction data is adjusted to be early.

On the other hand, the CPU 36 of the terminal apparatus 3 acquires the remaining amount of vibration waveform data stored in the vibration waveform data buffer in each certain cycle and determines whether or not the remaining amount of vibration waveform data is less than the predetermined amount. Then, when the remaining amount of vibration waveform data is less than the predetermined amount, the CPU 36 performs a vibration waveform data addition process for adding vibration waveform data to the vibration waveform data buffer. For example, when the remaining amount of vibration waveform data is less than 10 samples, the CPU 36 decodes the AM/FM code data received last again and adds 20 samples of vibration waveform data to the vibration waveform data buffer. Such a vibration waveform data addition process is performed, whereby even when the terminal apparatus 3 cannot temporarily receive vibration instruction data from the information processing apparatus 2, it is possible to vibrate the terminal apparatus 3 without interrupting the vibration. Further, such a vibration waveform data addition process is performed, whereby even when the information processing apparatus 2 does not transmit vibration instruction data, the terminal apparatus 3 can continue to vibrate based on the vibration instruction data transmitted last. That is, the terminal apparatus 3 performs the process of automatically adding vibration waveform data, whereby it is possible to reduce the amount of communication of vibration instruction data transmitted from the information processing apparatus 2 to the terminal apparatus 3.

It should be noted that when the remaining amount of vibration waveform data is less than the predetermined amount, and the current state is an abnormal state where the reception of vibration instruction data from the information processing apparatus 2 is interrupted for a certain time or more, the CPU 36 of the terminal apparatus 3 performs a vibration waveform data addition process for adding fade-out data to the vibration waveform data buffer. Here, the fade-out data is vibration waveform data for gradually making smaller the amplitude of a vibration waveform obtained by decoding the AM/FM code data received last again. The terminal apparatus 3 is vibrated based on the fade-out data, whereby the vibration generated in the terminal apparatus 3 becomes gradually smaller and stops. Further, the certain time for determining the abnormality of the reception of vibration instruction data may be set to be longer (e.g., 0.5 sec) than the maximum cycle of transmitting vibration instruction data from the information processing apparatus 2, and may be set to 1.0 sec, for example.

Further, in the above example, when the remaining amount of vibration waveform data stored in the vibration waveform data buffer is less than the predetermined amount, vibration waveform data is added to the vibration waveform data buffer. Alternatively, when the state of vibration waveform data stored in the vibration waveform data buffer satisfies another condition, predetermined vibration waveform data may be added to the vibration waveform data buffer. As a first example, when the amount of change in the consumption of vibration waveform data stored in the vibration waveform data buffer is equal to or greater than a predetermined amount, a predetermined amount of vibration waveform data obtained by decoding the AM/FM code data received last again is added to the vibration waveform data buffer. As a second example, when the amount of vibration waveform data that can be further stored in the vibration waveform data buffer is equal to or greater than a predetermined amount, a predetermined amount of vibration waveform data obtained by decoding the AM/FM code data received last again is added to the vibration waveform data buffer. As a third example, when the amplitude indicated by vibration waveform data stored in the vibration waveform data buffer is outside a predetermined range (e.g., when the indicated amplitude is less than the amplitude at which the actuator 30 can vibrate, or when the indicated amplitude is less than the amplitude of a vibration that can be recognized by the user, or when the indicated amplitude exceeds an amplitude allowed by the actuator 30), vibration waveform data indicating the state of being outside the predetermined range is deleted from the vibration waveform data buffer. Then, the amplitude indicated by the deleted vibration waveform data is converted into an amplitude within the predetermined range, and the vibration waveform data after the conversion is added to the vibration waveform data buffer. As a fourth example, when the frequency indicated by vibration waveform data stored in the vibration waveform data buffer is outside a predetermined range (e.g., when the indicated frequency is other than the frequency at which the actuator 30 can vibrate, or when the indicated frequency is outside the frequency range in which a human being is considered to be able to feel the vibration (e.g., 0 to 1000 Hz)), vibration waveform data indicating the state of being outside the predetermined range is deleted from the vibration waveform data buffer. Then, the frequency indicated by the deleted vibration waveform data is converted into a frequency within the predetermined range, and the vibration waveform data after the conversion is added to the vibration waveform data buffer.

Next, a description is given of the details of a vibration control process performed by the information processing apparatus 2, which is the transmission source of vibration instruction data (AM/FM code data). First, with reference to FIG. 10, main data used in the vibration control process performed by the information processing apparatus 2 is described. FIG. 10 is a diagram showing examples of main data and programs stored in the memory 22 of the information processing apparatus 2 when the vibration control process is performed.

As shown in FIG. 10, the following are stored in the data storage area of the memory 22 of the information processing apparatus 2: AM/FM code data Da; transmission data Db; reception data Dc; vibration time data Dd; and the like. It should be noted that the memory 22 of the information processing apparatus 2 may store, as well as the data shown in FIG. 10, data and the like necessary for the processing, such as data used in an application to be executed. Further, in the program storage area of the memory 22 of the information processing apparatus 2, various programs Pa included in the vibration control program are stored.

The AM/FM code data Da is data indicating AM/FM code data (vibration instruction data) encoded based on original vibration waveform data prepared in advance in the information processing apparatus 2.

The transmission data Db is data indicating transmission data to be transmitted to the terminal apparatus 3. The reception data Dc is data indicating reception data received from the terminal apparatus 3.

The vibration time data Dd is data indicating the vibration time for which an instruction is given as vibration instruction data.

Figure 11:
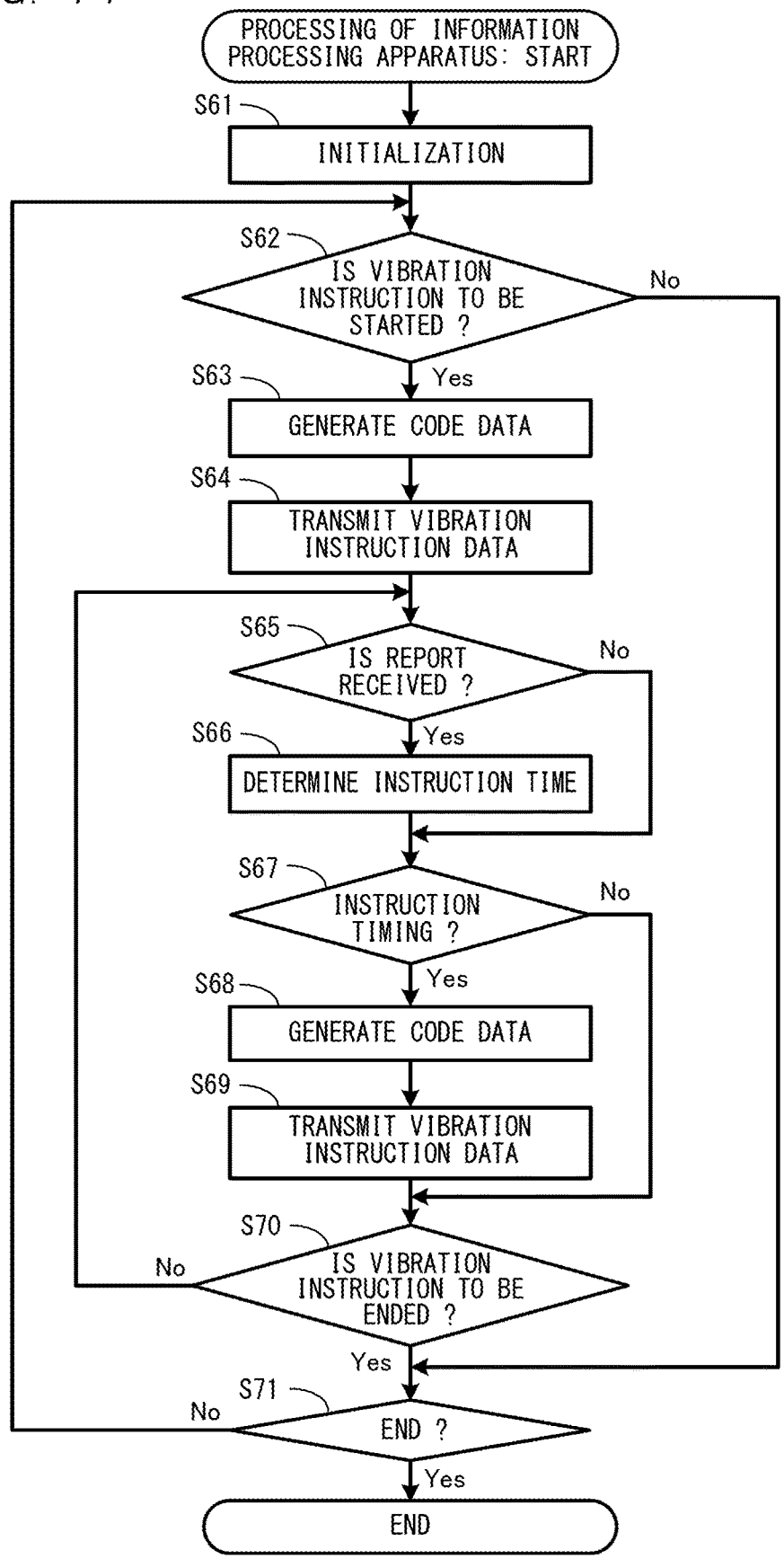
FIG. 11 is a flow chart showing a non-limiting example of the vibration control process executed by the information processing apparatus 2.

Next, with reference to FIG. 11, a description is given of an example of the vibration control process performed by the information processing apparatus 2. It should be noted that FIG. 11 is a flow chart showing an example of the vibration control process executed by the information processing apparatus 2. Here, in the flow chart shown in FIG. 11, a description is given mainly of, in the processing performed by the information processing apparatus 2, the process of generating and transmitting vibration instruction data. The detailed descriptions of other processes not directly related to these processes are omitted. Further, in FIG. 11, all of the steps performed by the CPU 21 of the information processing apparatus 2 are abbreviated as "S".

When performing the vibration control process, the CPU 21 initializes the memory 22 and the like and loads the vibration control program from the program storage section 23 into the memory. Then, the CPU 21 starts the execution of the vibration control program. The flow chart shown in FIG. 11 is a flow chart showing the processing performed after the above processes are completed.

It should be noted that the processes of all of the steps in the flow chart shown in FIG. 11 are merely illustrative. Thus, the processing order of the steps may be changed, or another process may be performed in addition to and/or instead of the processes of all of the steps, so long as similar results are obtained. Further, in the exemplary embodiment, the descriptions are given on the assumption that the CPU 21 performs the processes of all of the steps in the flow chart. Alternatively, the CPU 21 may perform the processes of some of the steps in the flow chart, and a processor or a dedicated circuit other than the CPU 21 may perform the processes of the other steps. Yet alternatively, a processor or a dedicated circuit other than the CPU 21 may perform the processes of all of the steps in the flow chart.

Referring to FIG. 11, the CPU 21 performs initialization (step 61), and the processing proceeds to the next step. For example, the CPU 21 performs initialization for transmitting vibration instruction data (AM/FM code data) to the terminal apparatus 3. As an example, the CPU 21 initializes the number of frequency ranges for which AM/FM code data is to be transmitted, the range of each frequency range, the cycle of transmitting AM/FM code data, the vibration time for which a vibration instruction is to be given, an encoding table for use in encoding, and the like.

Next, the CPU 21 determines whether or not to start giving a vibration output instruction to the terminal apparatus 3 (step 62). For example, when an application executed by the information processing apparatus 2 reaches the timing when the terminal apparatus 3 starts outputting a vibration, the determination is affirmative in the above step 62. Then, when the CPU 21 is to start giving a vibration output instruction to the terminal apparatus 3, the processing proceeds to step 63. On the other hand, when the CPU 21 is not to give a vibration output instruction to the terminal apparatus 3, the processing proceeds to step 71.

In step 63, the CPU 21 generates code data to be transmitted to the terminal apparatus 3, and the processing proceeds to the next step. As described above, using original vibration waveform data from which AM/FM code data is to be generated, the CPU 21 generates an envelope waveform and FM information of each frequency range to be transmitted and encodes the amount of change in the amplitude of the vibration and the amount of change in the frequency of the vibration based on the predetermined encoding table, thereby generating AM/FM code data corresponding to a predetermined vibration time with respect to each frequency range. Then, the CPU 21 stores the AM/FM code data in the AM/FM code data Da.

Next, the CPU 21 stores the AM/FM code data stored in the AM/FM code data Da, together with another piece of transmission data in the transmission data Db. Then, the CPU 21 transmits the transmission data stored in the transmission data Db to the terminal apparatus 3 via the communication section 24 (step 64), and the processing proceeds to the next step.

It should be noted that the above process of encoding AM/FM code data (i.e., the process of step 63) may be performed in advance in an offline process by the information processing apparatus 2, and the AM/FM code data may be stored as the AM/FM code data Da. Alternatively, the above process of encoding AM/FM code data may be performed in real time in accordance with a request to generate a vibration.

Next, the CPU 21 determines whether or not report data is received from the terminal apparatus 3 (step 65). Then, when report data is received from the terminal apparatus 3, the CPU 21 stores the received report data in the reception data Dc, and the processing proceeds to step 66. On the other hand, when report data is not received from the terminal apparatus 3, the processing proceeds to step 67.

In step 66, based on the report data received in the above step 65, the CPU 21 determines the vibration time for which a vibration instruction is to be given next to the terminal apparatus 3, and the processing proceeds to step 67. For example, based on information indicating the vibration state of the terminal apparatus 3 included in the report data (e.g., data indicating whether or not the remaining amount of vibration waveform data in the vibration waveform data buffer or vibration waveform data is automatically added), the CPU 21 determines the vibration time in vibration instruction data to be transmitted next. As an example, when the remaining amount of vibration waveform data is larger than an assumed amount, the CPU 21 sets the vibration time in the vibration instruction data to be transmitted next to a relatively short time (e.g., a time shorter than the vibration time for which the previous vibration instruction is given, or a time shorter than a time normally determined in advance), thereby updating the vibration time data Dd. Further, when the remaining amount of vibration waveform data is smaller than the assumed amount, the CPU 21 sets the vibration time in the vibration instruction data to be transmitted next to a relatively long time (e.g., a time longer than the vibration time for which the previous vibration instruction is given, or a time longer than the time normally determined in advance), thereby updating the vibration time data Dd. Further, when vibration waveform data is added to the vibration waveform data buffer in the terminal apparatus 3 at unexpected timing, the CPU 21 sets the vibration time in the vibration instruction data to be transmitted next to a relatively long time, thereby updating the vibration time data Dd. Alternatively, the CPU 21 adjusts the transmission timing of the next vibration instruction data to be early.

In step 67, the CPU 21 determines whether or not the current time is the timing when vibration instruction data is transmitted to the terminal apparatus 3. Then, when the current time is the timing when vibration instruction data is transmitted to the terminal apparatus 3, the processing proceeds to step 68. On the other hand, when the current time is not the timing when vibration instruction data is transmitted to the terminal apparatus 3, the processing proceeds to step 70. Here, as described above, the timing when the information processing apparatus 2 transmits vibration instruction data to the terminal apparatus 3 may be every predetermined transmission cycle corresponding to a predetermined sample of vibration waveform data to be generated by the terminal apparatus 3, or may be the timing when the amplitude and/or the frequency of the vibration for which an instruction is given change.

In step 68, based on the vibration time indicated by the vibration time data Dd, the CPU 21 generates code data to be transmitted to the terminal apparatus 3, and the processing proceeds to the next step. For example, using original vibration waveform data from which AM/FM code data is to be generated, the CPU 21 generates AM/FM code data corresponding to a vibration length corresponding to the vibration time indicated by the vibration time data Dd, similarly to the above step 63, and stores the AM/FM code data in the AM/FM code data Da. It should be noted that when stopping the vibration of the terminal apparatus 3 in the above step 68, the CPU 21 may generate data indicating the stop of the vibration (e.g., AM/FM code data indicating a vibration of which the amplitude is 0).

Next, the CPU 21 stores the AM/FM code data stored in the AM/FM code data Da, together with another piece of transmission data in the transmission data Db. Then, the CPU 21 transmits the transmission data stored in the transmission data Db to the terminal apparatus 3 via the communication section 24 (step 69), and the processing proceeds to step 70.

In step 70, the CPU 21 determines whether or not to end the vibration output instruction given to the terminal apparatus 3. For example, when data indicating the stop of the vibration is generated in the above step 68, the determination is affirmative in the above step 70. Then, when the CPU 21 is to end the vibration output instruction given to the terminal apparatus 3, the processing proceeds to step 71. On the other hand, when the CPU 21 is to continue the vibration output instruction given to the terminal apparatus 3, the processing returns to the above step 65, and the process of step 65 is repeated.

In step 71, the CPU 21 determines whether or not the processing is to be ended. Examples of a condition for ending the processing include: the satisfaction of the condition under which the processing is to be ended; and the fact that the user performs the operation of ending the processing. When the processing is not to be ended, the processing returns to the above step 62, and the process of step 62 is repeated. When the processing is to be ended, the processing indicated by the flow chart ends.

Figure 12:
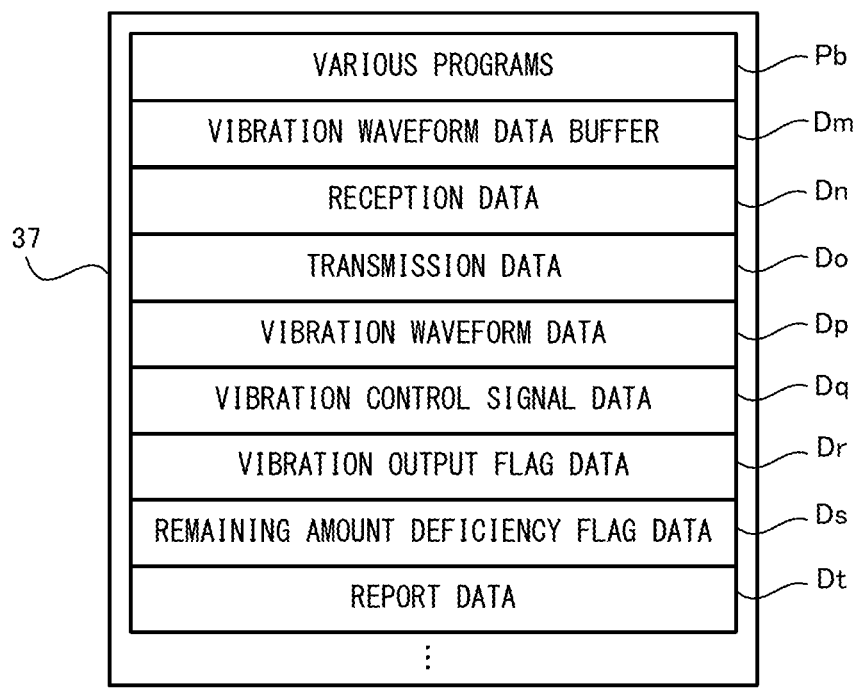
FIG. 12 is a diagram showing non-limiting examples of main data and programs stored in a memory 37 of the terminal apparatus 3 when a vibration output process is performed.

Next, a description is given of the details of a vibration output process performed by the terminal apparatus 3, which is the transfer destination of AM/FM code data. First, with reference to FIG. 12, main data used in the vibration output process performed by the terminal apparatus 3 is described. FIG. 12 is a diagram showing examples of main data and programs stored in the memory 37 of the terminal apparatus 3 when the vibration output process is performed.

As shown in FIG. 12, the following are stored in the data storage area of the memory 37: a vibration waveform data buffer Dm; reception data Dn; transmission data Do; vibration waveform data Dp; vibration control signal data Dq; vibration output flag data Dr; remaining amount deficiency flag data Ds; report data Dt; and the like. It should be noted that the memory 37 may store, as well as the data shown in FIG. 12, data and the like necessary for the processing, such as data used in an application to be executed. Further, in the program storage area of the memory 37, various programs Pb included in the vibration output program are stored. For example, the various programs Pb include a reception program for receiving vibration instruction data (AM/FM code data), a decoding program for decoding AM/FM code data, a vibration control signal generation program for generating a vibration control signal, and the like.

The vibration waveform data buffer Dm is a data area for temporarily accumulating vibration waveform data generated in a decoding process by the CPU 36.

The reception data Dn is data indicating reception data received from the information processing apparatus 2. The transmission data Do is data indicating transmission data to be transmitted to the information processing apparatus 2.

The vibration waveform data Dp is data indicating a vibration waveform generated by decoding vibration instruction data (AM/FM code data) received from the information processing apparatus 2. The vibration control signal data Dq is data indicating a vibration control signal to be output to the vibration output section (the low-pass filter 32).

The vibration output flag data Dr is data indicating a vibration output flag, which is set to on when the process of vibrating the terminal apparatus 3 is performed. The remaining amount deficiency flag data Ds is data indicating a remaining amount deficiency flag, which is set to on when the process of automatically adding vibration waveform data to the vibration waveform data buffer Dm is performed.

The report data Dt is data indicating information (report data) for notifying the information processing apparatus 2 of the state of the vibration of the terminal apparatus 3.

Figure 13:
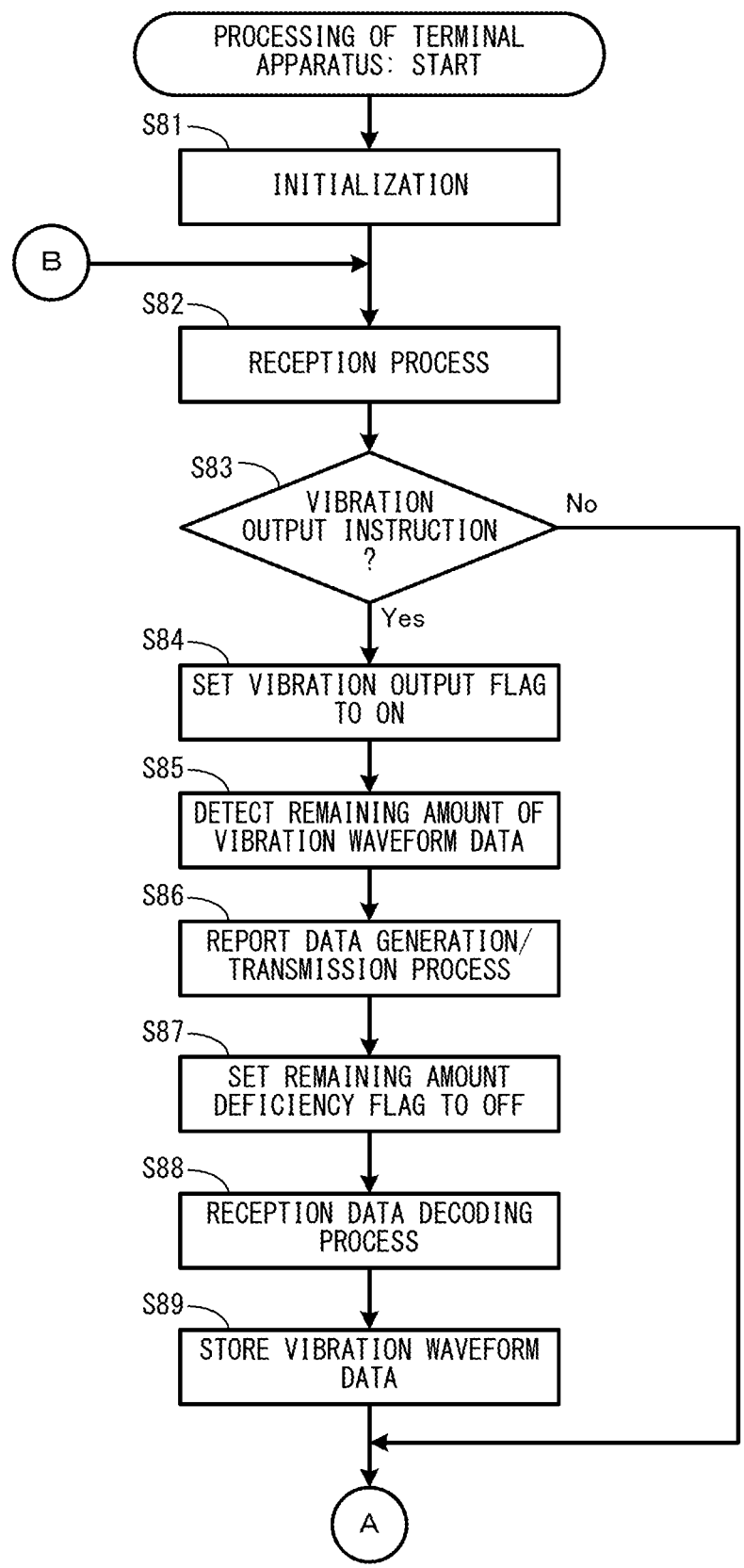
FIG. 13 is a flow chart showing a non-limiting example of the first half of the vibration output process executed by the terminal apparatus 3.
Figure 14:
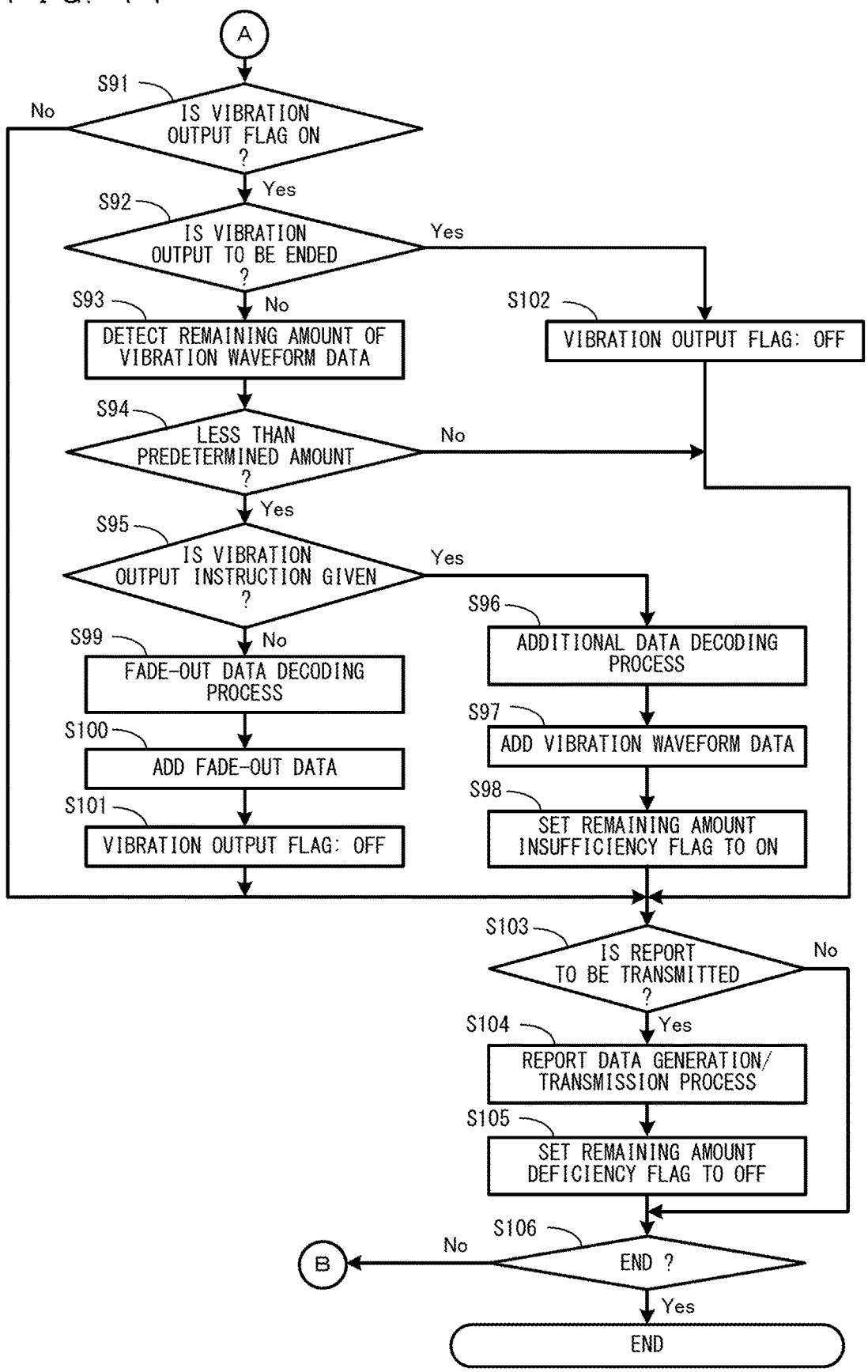
FIG. 14 is a flow chart showing a non-limiting example of the second half of the vibration output process executed by the terminal apparatus 3.

Next, with reference to FIGS. 13 and 14, a description is given of an example of the vibration output process performed by the terminal processing apparatus 3. It should be noted that FIG. 13 is a flow chart showing an example of the first half of the vibration output process executed by the terminal apparatus 3. FIG. 14 is a flow chart showing an example of the second half of the vibration output process executed by the terminal apparatus 3. Here, in the flow charts shown in FIGS. 13 and 14, a description is given mainly of, in the processing performed by the terminal apparatus 3, the process of receiving vibration instruction data from the information processing apparatus 2 and generating vibration waveform data. It should be noted that regarding a vibration control signal to be used by the vibration output section of the terminal apparatus 3, vibration waveform data stored in the vibration waveform data buffer Dm is appropriately read in a predetermined cycle by the FIFO method and encoded, thereby generating a vibration control signal. Then, the vibration control signal is output, and the read vibration waveform data is sequentially erased from the vibration waveform data buffer Dm. Further, the detailed descriptions of other processes not directly related to these processes are omitted. Further, in FIGS. 13 and 14, all of the steps performed by the CPU 36 of the terminal apparatus 3 are abbreviated as "S".

The CPU 36 of the terminal apparatus 3 initializes the memory 37 and the like and loads the vibration output program from the storage section 38 of the information processing apparatus 3 into the memory 37. Then, the CPU 36 starts the execution of the vibration output program. The flow charts shown in FIGS. 13 and 14 are flow charts showing the processing performed after the above processes are completed.

It should be noted that the processes of all of the steps in the flow charts shown in FIGS. 13 and 14 are merely illustrative. Thus, the processing order of the steps may be changed, or another process may be performed in addition to and/or instead of the processes of all of the steps, so long as similar results are obtained. Further, in the exemplary embodiment, the descriptions are given on the assumption that the CPU 36 of the terminal apparatus 3 performs the processes of all of the steps in the flow charts. Alternatively, the CPU 36 may perform the processes of some of the steps in the flow charts, and a processor or a dedicated circuit other than the CPU 36 may perform the processes of the other steps. Yet alternatively, a processor or a dedicated circuit other than the CPU 36 may perform the processes of all of the steps in the flow charts.

Referring to FIG. 13, the CPU 36 performs initialization (step 81), and the processing proceeds to the next step. For example, the CPU 36 performs initialization for receiving vibration instruction data (AM/FM code data) from the information processing apparatus 2. As an example, the CPU 36 sets the number of frequency ranges for which AM/FM code data is to be received, the range of each frequency range, the cycle of receiving AM/FM code data, an encoding table for use in a decoding process, and the like, thereby initializing parameters. Further, the CPU 36 initializes parameters for use in the process of controlling the remaining amount of data in the vibration waveform data buffer Dm, the process of transmitting report data to the information processing apparatus 2, the process of outputting a vibration control signal to the vibration output section, and the like. It should be noted that the parameters to be set in the above initialization may be set based on information described in reception data received from the information processing apparatus 2.

Next, the CPU 36 performs a reception process for receiving data from the information processing apparatus 2 (step 82), and the processing proceeds to the next step. For example, the CPU 36 stores, as the reception data Dn, data received from the information processing apparatus 2 via the communication section 39.

Next, the CPU 36 determines whether or not the reception data received in the above step 82 is vibration instruction data for giving an instruction to output a vibration (step 83). Then, when the reception data is vibration instruction data, the processing proceeds to step 84. On the other hand, when the reception data is not vibration instruction data, or when reception data is not received, the processing proceeds to step 91 (see FIG. 14).

In step 84, the CPU 36 sets the vibration output flag to on, and the processing proceeds to the next step. For example, when the vibration output flag indicated by the vibration output flag data Dr is off, the CPU 36 updates the vibration output flag to on.

Next, the CPU 36 detects the remaining amount of vibration waveform data (step 85), and the processing proceeds to the next step. For example, the CPU 36 detects the remaining amount of vibration waveform data stored in the vibration waveform data buffer Dm. It should be noted that as will be apparent later, in the vibration waveform data buffer Dm, vibration waveform data generated by a vibration instruction data decoding process, an additional data decoding process, and a fade-out data decoding process is additionally stored. Further, as described above, regarding vibration waveform data stored in the vibration waveform data buffer Dm, in accordance with the fact that a vibration control signal to be output to the vibration output section is generated in each predetermined cycle, read vibration waveform data is sequentially erased from the vibration waveform data buffer Dm. That is, in the above step 85, the balance between the amount of vibration waveform data additionally stored in the vibration waveform data buffer Dm and the amount of vibration waveform data read and erased from the vibration waveform data buffer Dm is detected.

Next, the CPU 36 generates report data in which the remaining amount of vibration waveform data detected in the above step 85 is described, and transmits the report data to the information processing apparatus 2 via the communication section 39 (step 86), and the processing proceeds to the next step. Here, with reference to the remaining amount deficiency flag data Ds, when the remaining amount deficiency flag is set to on, the CPU 36 also describes, in the report data, data indicating that the process of automatically adding vibration waveform data to the vibration waveform data buffer Dm is performed. Then, the CPU 36 transmits the report data to the information processing apparatus 2.

Next, when the remaining amount deficiency flag indicated by the remaining amount deficiency flag data Ds is set to on, the CPU 36 updates the remaining amount deficiency flag to off (step 87), and the processing proceeds to the next step.

Next, the CPU 36 performs the process of decoding the AM/FM code data received in the above step 82 (step 88), and the processing proceeds to the next step. For example, the CPU 36 retrieves AM information and FM information from the AM/FM code data received in the above step 82, generates a frequency modulation sine wave (an FM wave) from the retrieved FM information, and generates an AM/FM wave that is displaced with an amplitude corresponding to the AM information. Then, the CPU 36 generates an AM/FM wave corresponding to the vibration length of the received AM/FM code data with respect to each frequency range and sums up the AM/FM waves of the respective frequency ranges, thereby generating a combined wave. Then, the CPU 36 stores, as the vibration waveform data Dp, vibration waveform data indicating the combined wave.

Next, the CPU 36 stores the vibration waveform data decoded in the above step 88 in the vibration waveform data buffer Dm by the FIFO method (step 89), and the processing proceeds to step 91 (see FIG. 14).

Referring to FIG. 14, in step 91, the CPU 36 determines whether or not the vibration output flag indicated by the vibration output flag data Dr is on. Then, when the vibration output flag is on, the processing proceeds to step 92. On the other hand, when the vibration output flag is off, the processing proceeds to step 103.

In step 92, the CPU 36 determines whether or not the vibration output process is to be ended. For example, when the vibration instruction data received from the information processing apparatus 2 is data indicating that the vibration is to be stopped (e.g., data indicating a vibration of which the amplitude is 0), the CPU 36 determines that the vibration output process is to be ended. Then, the vibration output process is not to be ended, the processing proceeds to step 93. On the other hand, when the vibration output process is to be ended, the processing proceeds to step 102.

In step 93, the CPU 36 detects the remaining amount of vibration waveform data, and the processing proceeds to the next step. It should be noted that the CPU 36 detects the remaining amount of vibration waveform data stored in the vibration waveform data buffer Dm also in the above step 93. The process of step 93, however, is similar to the process of the above step 85 and therefore is not described in detail here.

Next, the CPU 36 determines whether or not the remaining amount of vibration waveform data detected in the above step 93 is less than a predetermined amount (step 94). For example, when the remaining amount of vibration waveform data stored in the vibration waveform data buffer Dm is less than 10 samples, the determination is affirmative in the above step 94. Then, when the remaining amount of vibration waveform data is less than the predetermined amount, the processing proceeds to step 95. On the other hand, when the remaining amount of vibration waveform data is equal to or greater than the predetermined amount, the processing proceeds to step 103.

In step 95, the CPU 36 determines whether or not vibration instruction data periodically transmitted from the information processing apparatus 2 is received within a predetermined time. For example, when vibration instruction data is received within 1.0 sec, the determination is affirmative in the above step 95. Then, when vibration instruction data is received within the predetermined time, the processing proceeds to step 96. On the other hand, when vibration instruction data is not received within the predetermined time, the processing proceeds to step 99.

In step 96, the CPU 36 performs an additional data decoding process, and the processing proceeds to the next step. For example, with reference to the reception data Dn, the CPU 36 decodes the AM/FM code data received last again for a predetermined vibration length (e.g., 20 samples), thereby generating vibration waveform data to be added to the vibration waveform data buffer Dm. Then, the CPU 36 stores the vibration waveform data in the vibration waveform data Dp. It should be noted that the process of decoding the AM/FM code data is similar to the above step 88 and therefore is not described in detail here.

Next, the CPU 36 performs the process of additionally storing, in the vibration waveform data buffer Dm by the FIFO method, the vibration waveform data corresponding to the predetermined vibration length decoded in the above step 95 (step 97), and the processing proceeds to the next step.

Next, the CPU 36 updates the remaining amount deficiency flag indicated by the remaining amount deficiency flag data Ds to on (step 98), and the processing proceeds to step 103.

On the other hand, when the determination is negative in the above step 95 (i.e., when vibration instruction data is not received within the predetermined time), the CPU 36 performs a fade-out data decoding process, and the processing proceeds to the next step. For example, based on the vibration waveform data decoded and generated last in the above step 88 or the above step 96, the CPU 36 generates a vibration waveform in which the amplitude indicated by this vibration waveform becomes gradually smaller and becomes 0. Then, the CPU 36 stores vibration waveform data indicating the vibration waveform in the vibration waveform data Dp.

Next, the CPU 36 performs a fade-out data addition process for additionally storing, in the vibration waveform data buffer Dm by the FIFO method, the vibration waveform data generated in the above step 99 (step 100), and the processing proceeds to the next step.

Next, the CPU 36 updates the vibration output flag indicated by the vibration output flag data Dr to off (step 101), and the processing proceeds to step 103.

Further, when the determination is affirmative in the above step 92 (i.e., when the vibration output process is to be ended), the CPU 36 updates the vibration output flag indicated by the vibration output flag data Dr to off (step 102), and the processing proceeds to step 103.

In step 103, the CPU 36 determines whether or not the current time is the timing when report data is transmitted to the information processing apparatus 2. For example, as the report data, report data may be transmitted in each certain cycle not related to the above step 86. Alternatively, report data may be transmitted by being included in another piece of data to be sent from the terminal apparatus 3. In the above step 103, it is determined whether or not the current moment corresponds to this cycle or another data transmission timing. Then, when the current time is the timing when report data is transmitted, the processing proceeds to step 104. On the other hand, when the current time is not the timing when report data is transmitted, the processing proceeds to step 106.

In step 104, the CPU 36 generates report data in which the remaining amount of vibration waveform data detected in the above step 93 is described, and transmits the report data to the information processing apparatus 2 via the communication section 39, and the processing proceeds to the next step. Here, with reference to the remaining amount deficiency flag data Ds, when the remaining amount deficiency flag is set to on, the CPU 36 also describes, in the report data, data indicating that the process of automatically adding vibration waveform data to the vibration waveform data buffer Dm (i.e., the process of the above step 96) is performed. Then, the CPU 36 transmits the report data to the information processing apparatus 2.

Next, when the remaining amount deficiency flag indicated by the remaining amount deficiency flag data Ds is set to on, the CPU 36 updates the remaining amount deficiency flag to off (step 105), and the processing proceeds to step 106.

In step 106, the CPU 36 determines whether or not the processing is to be ended. Examples of a condition for ending the processing include: the satisfaction of the condition under which the processing is to be ended; and the fact that the user performs the operation of ending the processing. When the processing is not to be ended, the processing returns to the above step 82 (see FIG. 13) and the process of step 82 is repeated. When the processing is to be ended, the processing indicated by the flow charts ends.

As described above, in the processing according to the above exemplary embodiment, report data indicating a vibration output state and the like is transmitted from the terminal apparatus 3 to the information processing apparatus 2. Consequently, the information processing apparatus 2 can perform an appropriate vibration control process using the transmitted report data. For example, when the remaining amount of vibration waveform data to be generated by the terminal apparatus 3 is described in the report data, the information processing apparatus 2 can transmit, to the terminal apparatus 3, AM/FM code data indicating a vibration for a vibration length corresponding to this remaining amount. Thus, it is possible to control a vibration based on an appropriate amount of data.

Further, in the processing according to the above exemplary embodiment, when the remaining amount of vibration waveform data in the vibration waveform data buffer is less than a predetermined amount, the terminal apparatus 3 automatically adds vibration waveform data. Consequently, even when the terminal apparatus 3 cannot temporarily receive vibration instruction data from the information processing apparatus 2, it is possible to vibrate the terminal apparatus 3 without interrupting the vibration. Further, even when the information processing apparatus 2 does not transmit vibration instruction data, the terminal apparatus 3 can continue to vibrate based on the vibration instruction data transmitted last. Thus, it is possible to reduce the amount of communication of vibration instruction data transmitted from the information processing apparatus 2 to the terminal apparatus 3.

It should be noted that in the above exemplary embodiment, when the terminal apparatus 3 receives vibration instruction data transmitted from the information processing apparatus 2, the terminal apparatus 3 transmits report data to the information processing apparatus 2 and then decodes the vibration instruction data. Consequently, it is possible to create report data in the state where the remaining amount of vibration waveform data in the vibration waveform data buffer Dm is relatively small. Thus, it is possible to notify the information processing apparatus 2 of a more detailed remaining amount, using the number of bits that can be transmitted by report data. It should be noted that if such an effect is not desired, the terminal apparatus 3 may decode the received vibration instruction data, store vibration waveform data corresponding to the vibration instruction data in the vibration waveform data buffer Dm, and then generate report data indicating the remaining amount of vibration waveform data in the vibration waveform data buffer Dm.

Further, in the above exemplary embodiment, the information processing apparatus 2 transmits vibration instruction data generated by encoding vibration waveform data to the terminal apparatus 3. Alternatively, the information processing apparatus 2 may transmit data in another form as data for instructing the terminal apparatus 3 to vibrate. For example, the information processing apparatus 2 may transmit vibration waveform data as it is as vibration instruction data. Alternatively, the information processing apparatus 2 may transmit, as vibration instruction data, data obtained by compressing vibration waveform data by a predetermined method.

Further, in the above exemplary embodiment, vibration waveform data generated by decoding AM/FM code data is stored in the vibration waveform data buffer Dm, and the vibration waveform data stored in the vibration waveform data buffer Dm is converted into a predetermined bit pattern and thereby output to the vibration output section. However, data to be stored in the vibration waveform data buffer Dm may be in another data format. For example, AM/FM code data received by the terminal apparatus 3 may be stored as it is in the vibration waveform data buffer Dm. Then, when output to the vibration output section, the AM/FM code data stored in the vibration waveform data buffer Dm is decoded every time, thereby generating vibration waveform data. Alternatively, data obtained by converting, into a predetermined bit pattern, vibration waveform data generated by decoding AM/FM code data received by the terminal apparatus 3 may be stored in the vibration waveform data buffer Dm.

Further, one of the amplitude and the frequency of a vibration to be generated by the terminal apparatus 3 may be a certain value determined in advance. In this case, without giving a vibration instruction for one of the amplitude and the frequency set to the certain value, the information processing apparatus 2 transmits, to the terminal apparatus 3, vibration instruction data (i.e., AM code data or FM code data) indicating a parameter for the other of the amplitude and the frequency.

Further, the actuator 30 may be provided outside the terminal apparatus 3. For example, the actuator 30 may be provided in an external apparatus attachable to the body (e.g., the head or the foot) of the user operating the terminal apparatus 3, or in an external apparatus that can be operated with the other hand. In this case, the terminal apparatus 3 and the external apparatus may perform wireless communication or wired communication with each other.

Further, in the above exemplary embodiment, an example has been used where a single actuator 30 is provided in the terminal apparatus 3. Alternatively, a plurality of actuators for imparting vibrations to the user may be provided inside the terminal apparatus 3 and/or outside the terminal apparatus 3. As an example, a pair of actuators may be provided in upper and lower portions or left and right portions in the terminal apparatus 3, or provided in the terminal apparatus 3 operated with one hand and an external apparatus operated with the other hand. In this case, the CPU 36 may generate vibration control signals for driving the respective actuators from a single piece of code data, or may generate vibration control signals for driving the respective actuators from different pieces of code data (e.g., code data for one of the actuators, and code data for the other actuator). In the second case, the information processing apparatus 2 transmits, to the terminal apparatus 3, vibration instruction data including a set of code data for one of the actuators and code data for the other actuator.

For example, when a plurality of actuators 30 are provided and independent vibrations are generated from the respective actuators 30, the CPU 36 outputs a vibration control signal for controlling the vibration of each actuator 30. In this case, with the use of phantom sensation that stimulates two different points in the user's skin (as an example, one hand of the user holding the terminal apparatus 3 and the other hand holding an external apparatus) to cause the user to perceive a pseudo stimulus at one point, it is also possible to impart, to the user of the terminal apparatus 3, vibrations for causing the user to perceive a place other than the position where the actuators are provided, as the vibration source in a pseudo manner.

Further, in the above exemplary embodiment, an example has been used where the information processing apparatus 2 for transmitting vibration instruction data wirelessly transmits the vibration instruction data to the terminal apparatus 3. Alternatively, the information processing apparatus 2 may transmit the vibration instruction data to the terminal apparatus 3 in a wired manner.

Further, the terminal apparatus 3 as the transmission destination of vibration instruction data may not be an operation apparatus (a so-called controller) held and operated by the user, and may be a device such as a mobile game apparatus, a mobile phone, or a PDA. It should be noted that the terminal apparatus 3 wirelessly connected to the information processing apparatus 2 may be a plurality of terminal apparatuses 3 (e.g., a plurality of controllers held by a plurality of users, or a pair of controllers held by a single user with both hands), and the system (e.g., a game system) may include the information processing apparatus 2 and the plurality of terminal apparatuses 3 into which actuators 30 are built. In this case, the information processing apparatus 2 transmits vibration instruction data for generating vibration waveform data to each of the plurality of terminal apparatuses 3 by wireless communication, thereby enabling each terminal apparatus 3 to generate a vibration corresponding to the vibration instruction data. It should be noted that the information processing apparatus 2 may not perform the process of encoding vibration waveform data, and data obtained by encoding vibration waveform data may be included in advance in a program or the like installed in the information processing apparatus 2. In this case, the information processing apparatus 2 outputs code data encoded in advance to the terminal apparatus 3, where necessary, and the terminal apparatus 3 decodes the code data. It should be noted that the communication between the information processing apparatus 2 and a single terminal apparatus 3 or a plurality of terminal apparatuses 3 may be performed in a wireless or wired manner.

Further, the above descriptions have been given using an example where the information processing apparatus 2 performs the vibration control process, and the terminal apparatus 3 performs the vibration output process. Alternatively, another apparatus may perform at least some of the processing steps in the processing. For example, when the information processing apparatus 2 and the terminal apparatus 3 are further configured to communicate with another apparatus (e.g., another server, another game apparatus, or another mobile terminal), the other apparatus may cooperate to perform the processing steps in the processing. Another apparatus may thus perform at least some of the processing steps in the processing, thereby enabling processing similar to the above processing. Further, the above processing can be performed by a processor or the cooperation of a plurality of processors, the processor or the plurality of processors included in an information processing system including at least one information processing apparatus. It should be noted that the information processing system including at least one information processing apparatus can be an information processing system including a plurality of information processing apparatuses (a so-called system including a complex of a plurality of apparatuses), or can be an information processing system including a single information processing apparatus (a so-called system including a single apparatus including a plurality of units). Further, in the above exemplary embodiment, the processing in the above flow charts is performed by the control section of each of the information processing apparatus 2 and the terminal apparatus 3 executing a predetermined vibration signal generation program. Alternatively, a part or all of the processing in the flow charts may be performed by a dedicated circuit included in each of the information processing apparatus 2 and the terminal apparatus 3.

Here, the above variations make it possible to achieve the exemplary embodiment also by a system form such as so-called cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the process of each step of the above processing. Thus, it goes without saying that it is possible to achieve the exemplary embodiment by sharing the processing in any manner.

Further, the processing orders, the setting values, the conditions used in the determinations, and the like that are used in the above information processing are merely illustrative. Thus, it goes without saying that the exemplary embodiment can be achieved also with other orders, other values, and other conditions. Further, the shapes, the number, the placement positions, the functions, and the like of the components used by the above information processing apparatus are merely illustrative, and may be other shapes, number, and placement positions. It goes without saying that the exemplary embodiment can be achieved by the information processing apparatus having other functions. Alternatively, the terminal apparatus 3 may be a handheld apparatus or a portable apparatus that is larger than a mobile apparatus. Here, a handheld apparatus is an apparatus that can be operated by the user holding it in their hands, and is a concept including the above mobile apparatus. Further, a portable apparatus is an apparatus that allows the movement of the main body of the apparatus when the apparatus is used, or allows a change in the orientation of the main body of the apparatus when the apparatus is used, or allows the carrying around of the main body of the apparatus, and is a concept including the above handheld apparatus and mobile apparatus.

Further, the vibration control program and the vibration output program may be supplied to the information processing apparatus 2 or the terminal apparatus 3 not only through an external storage medium such as an external memory, but also through a wired or wireless communication link. Further, the vibration control program and the vibration output program may be stored in advance in a non-volatile storage device included in the information processing apparatus 2 or the terminal apparatus 3. It should be noted that examples of an information storage medium having stored therein the vibration control program and the vibration output program may include CD-ROMs, DVDs, optical disk storage media similar to these, flexible disks, hard disks, magneto-optical disks, and magnetic tapes, as well as non-volatile memories. Alternatively, an information storage medium having stored therein the vibration control program and the vibration output program may be a volatile memory for storing the vibration control program and the vibration output program. It can be said that such a storage medium is a storage medium readable by a computer or the like. For example, it is possible to provide the above various functions by causing a computer or the like to load a game program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, a vibration control system, a vibration control method, a vibration output apparatus, a game controller, a vibration output program, a vibration output method, a vibration control apparatus, a vibration control program, and the like in order, for example, to make it possible to understand the state where a vibration is generated in an apparatus for generating a vibration.

What is claimed is:

1. A vibration control system, including at least a first apparatus and a second apparatus, for vibrating a vibration apparatus, the first apparatus comprising a computer processor configured to:
    receive vibration instruction data transmitted from the second apparatus;
    generate vibration state data indicating a vibration state of the vibration apparatus;
    store data related to the received vibration instruction data in a memory;
    vibrate the vibration apparatus using the data stored in the memory; and
    transmit the vibration state data to the second apparatus, the second apparatus comprising a computer processor configured to:

receive the vibration state data transmitted from the first apparatus;

based on the received vibration state data, determine vibration instruction data to be transmitted next to the first apparatus; and transmit the determined vibration instruction data to the first apparatus, wherein the vibration state data is data indicating a remaining amount of the data related to the vibration instruction data stored in the memory when the vibration state data is transmitted.

2. The vibration control system according to claim 1, wherein the computer processor of the second apparatus is configured to determine a timing for transmitting the determined vibration instruction data to the first apparatus based on the data indicating the remaining amount of the data related to the vibration instruction data stored in the memory when the vibration state data is transmitted.

3. The vibration control system according to claim 1, wherein in the vibration of the vibration apparatus, the data related to the vibration instruction data stored in the memory to vibrate the vibration apparatus is output to the vibration apparatus, and the data output to the vibration apparatus is deleted from the memory.

4. The vibration control system according to claim 1, wherein in the determination of the vibration instruction data, the vibration instruction data indicating a vibration for a vibration time corresponding to the remaining amount indicated by the received vibration state data is determined.

5. The vibration control system according to claim 4, wherein in the determination of the vibration instruction data, when the remaining amount indicated by the received vibration state data is larger than a predetermined amount, the vibration instruction data indicating a vibration for a relatively short vibration time is determined.

6. The vibration control system according to claim 1, wherein in the determination of the vibration instruction data, the vibration instruction data indicating a vibration for a vibration time corresponding to the vibration state of the vibration apparatus indicated by the received vibration state data is determined.

7. The vibration control system according to claim 1, wherein the computer processor of the first apparatus is further configured to output operation data corresponding to a user operation on the first apparatus, and in the transmission of the vibration state data, the vibration state data is transmitted together with the operation data to the second apparatus.

8. The vibration control system according to claim 1, wherein in the generation of the vibration state data, data indicating the vibration state of the vibration apparatus at a time before the data related to the received vibration instruction data is stored in the memory is generated as the vibration state data.

9. The vibration control system according to claim 1, wherein in the reception of the vibration instruction data, the vibration instruction data is received through wireless communication, in the transmission of the vibration state data, the vibration state data is transmitted through wireless communication, in the reception of the vibration state data, the vibration state data is received through wireless communication, and in the transmission of the vibration instruction data, the vibration instruction data is transmitted through wireless communication.

10. The vibration control system according to claim 1, wherein in the determination of the vibration instruction data, modulation information indicating changes in an amplitude and/or a frequency is encoded in a vibration waveform for vibrating the vibration apparatus, thereby generating the vibration instruction data, and in the storage of the data in the memory, every time the vibration instruction data is received, data obtained by decoding the vibration instruction data is stored in the memory.

11. The vibration control system according to claim 1, wherein the first apparatus includes the vibration apparatus within the first apparatus.

12. The vibration control system according to claim 1, wherein in the generation of the vibration state data, as the vibration state data, first vibration state data and second vibration state data different from the first vibration state data are generated.

13. The vibration control system according to claim 1, wherein the vibration state data includes data indicating a value of a clock in the first apparatus.

14. The vibration control system according to claim 1, wherein a vibration waveform data buffer is set in the memory and the vibration state data is data indicating a remaining amount of the data related to the vibration instruction data is stored in the waveform data buffer.

15. A vibration control method for vibrating a vibration apparatus, the vibration control method comprising:

receiving vibration instruction data transmitted from another apparatus;

generating vibration state data indicating a vibration state of the vibration apparatus;

storing data related to the received vibration instruction data in a memory;

vibrating the vibration apparatus using the data stored in the memory;

transmitting the vibration state data to the other apparatus;

receiving the vibration state data in the other apparatus;

based on the received vibration state data, determining vibration instruction data to be transmitted next; and transmitting the determined vibration instruction data from the other apparatus, wherein the vibration state data is data indicating a remaining amount of the data related to the vibration instruction data stored in the memory when the vibration state data is transmitted.

16. A vibration output apparatus for vibrating a vibration apparatus, the vibration output apparatus comprising a computer processor configured to:

receive vibration instruction data transmitted from another apparatus;

generate vibration state data indicating a vibration state of the vibration apparatus;

store data related to the received vibration instruction data in a memory;

vibrate the vibration apparatus using the data stored in the memory; and transmit the vibration state data to the other apparatus, wherein the vibration state data is data indicating a remaining amount of the data related to the vibration instruction data stored in the memory when the vibration state data is transmitted.

17. A game controller configured to wirelessly communicate with a game apparatus, and including a vibration apparatus within the game controller, the game controller comprising a computer processor configured to:

output operation data corresponding to a user operation on the game controller;

receive, from the game apparatus through wireless communication, vibration instruction data for instructing the vibration apparatus to vibrate;

store, in a memory, data related to the vibration instruction data received from the game apparatus;

vibrate the vibration apparatus using the data stored in the memory;

using the data stored in the memory, generate vibration state data indicating a state of the data related to the vibration instruction data; and transmit the vibration state data together with the operation data to the game apparatus through wireless communication, wherein the vibration state data is data indicating a remaining amount of the data related to the vibration instruction data stored in the memory when the vibration state data is transmitted.

18. The game controller according to claim 17, wherein the vibration state data includes data indicating a value of a clock in the game controller.

19. The game controller according to claim 17, wherein in the vibration of the vibration apparatus, the data related to the vibration instruction data stored in the memory to vibrate the vibration apparatus is output to the vibration apparatus, and the data output to the vibration apparatus is deleted from the memory.

20. The game controller according to claim 17, wherein in the generation of the vibration state data, data indicating a vibration state of the vibration apparatus at a time before the data related to the received vibration instruction data is stored in the memory is generated as the vibration state data.

21. The game controller according to claim 17, wherein in the generation of the vibration state data, as the vibration state data, first vibration state data and second vibration state data different from the first vibration state data are generated.

22. A non-transitory computer-readable storage medium having stored therein a vibration output program executed by a computer included in a vibration output apparatus for vibrating a vibration apparatus, the vibration output program causing the computer to execute:

receiving vibration instruction data transmitted from another apparatus;

generating vibration state data indicating a vibration state of the vibration apparatus;

storing data related to the received vibration instruction data in a memory;

vibrating the vibration apparatus using the data stored in the memory; and transmitting the vibration state data to the other apparatus, wherein the vibration state data is data indicating a remaining amount of the data related to the vibration instruction data stored in the memory when the vibration state data is transmitted.

23. A vibration output method executed by a processor or cooperation of a plurality of processors, the processor or the plurality of processors included in a system including at least one apparatus for vibrating a vibration apparatus, the vibration output method comprising:

receiving vibration instruction data transmitted from another apparatus;

generating vibration state data indicating a vibration state of the vibration apparatus;

storing data related to the received vibration instruction data in a memory;

vibrating the vibration apparatus using the data stored in the memory; and transmitting the vibration state data to the other apparatus, wherein the vibration state data is data indicating a remaining amount of the data related to the vibration instruction data stored in the memory when the vibration state data is transmitted.

24. A vibration control apparatus for, in another apparatus for vibrating a vibration apparatus, controlling the vibration, the vibration control apparatus comprising a computer processor configured to:

receive vibration state data indicating a vibration state of the vibration apparatus from the other apparatus, wherein the vibration state data is data indicating a remaining amount of data related to vibration instruction data stored in memory of the other apparatus when the vibration state data is transmitted by the other apparatus;

based on the received vibration state data, determine vibration instruction data for vibrating the vibration apparatus to be transmitted next to the other apparatus; and transmit the determined vibration instruction data to the other apparatus.

25. A non-transitory computer-readable storage medium having stored therein a vibration control program executed by a computer included in a vibration control apparatus for, in another apparatus for vibrating a vibration apparatus, controlling the vibration, the vibration control program causing the computer to execute:

receiving vibration state data indicating a vibration state of the vibration apparatus from the other apparatus, the vibration state data is data indicating a remaining amount of data related to vibration instruction data stored in memory of the other apparatus when the vibration state data is transmitted by the other apparatus;

based on the received vibration state data, determining vibration instruction data for vibrating the vibration apparatus to be transmitted next to the other apparatus; and transmitting the determined vibration instruction data to the other apparatus.

26. A vibration control method executed by a processor or cooperation of a plurality of processors, the processor or the plurality of processors included in a system including at least one apparatus for, in another apparatus for vibrating a vibration apparatus, controlling the vibration, the vibration control method comprising:

receiving vibration state data indicating a vibration state of the vibration apparatus from the other apparatus, the vibration state data is data indicating a remaining amount of data related to vibration instruction data stored in memory of the other apparatus when the vibration state data is transmitted by the other apparatus;

based on the received vibration state data, determining vibration instruction data for vibrating the vibration apparatus to be transmitted next to the other apparatus; and transmitting the determined vibration instruction data to the other apparatus.

* * * * *